US012686058B2

(12) United States Patent
Coleman et al.

(10) Patent No.: US 12,686,058 B2
(45) Date of Patent: Jul. 21, 2026

(54) METHODS FOR PREVENTING NOTCH FORMATION IN, AND/OR EXTENDING THE USEFUL LIFE OF, CUTTING TOOLS FOR TURNING, AND ASSOCIATED SYSTEMS

(71) Applicant: Celeritive Technologies, Inc., Moorpark, CA (US)

(72) Inventors: Glenn Coleman, Cave Creek, AZ (US); Joseph McChesney, Moorpark, CA (US); Evan C. Sherbrooke, Moorpark, CA (US)

(73) Assignee: Celeritive Technologies, Inc., Moorpark, CA (US)

( * ) Notice: Subject to any disclaimer, the term of this patent is extended or adjusted under 35 U.S.C. 154(b) by 890 days.

(21) Appl. No.: 17/840,241

(22) Filed: Jun. 14, 2022

(65) Prior Publication Data
US 2023/0040385 A1     Feb. 9, 2023

Related U.S. Application Data

(60) Provisional application No. 63/229,486, filed on Aug. 4, 2021.

(51) Int. Cl.
B23B 5/16          (2006.01)
B23B 1/00          (2006.01)
(Continued)

(52) U.S. Cl.
CPC . B23B 7/12 (2013.01); B23B 1/00 (2013.01)

(58) Field of Classification Search
CPC ........... B23B 1/00; B23B 7/12; B23B 27/164; B23B 2200/0461; B23B 2200/202; B23B 2226/18
See application file for complete search history.

(56) References Cited

U.S. PATENT DOCUMENTS 4,569,014 A    2/1986  Kishi et al.
4,597,040 A *  6/1986  Buizer ................. G05B 19/182
                                                          700/192
(Continued)

FOREIGN PATENT DOCUMENTS

DE         19518750 C1 *  9/1996   ............... B23B 1/00
DE         10317344 A1 * 11/2004   ............... B23B 1/00
(Continued)

OTHER PUBLICATIONS

International Search Report and Written Opinion for International Patent Application No. PCT/US2022/033446, Applicant: Celeritive Technologies, Inc., mailed Sep. 29, 2022, 11 pages.
(Continued)

*Primary Examiner* — Sara Addisu
(74) *Attorney, Agent, or Firm* — Perkins Coie LLP

(57)          ABSTRACT

Technology for turning selected portions of a workpiece by a cutting tool is described. The described technology can provide methods and apparatuses for turning areas of a part so that corner strikes are avoided upon material entry, burr formation upon material exit is eliminated or significantly reduced, and/or the instantaneous cut depth continuously changes to avoid notch formation. The resulting superior machining conditions can enable more aggressive machining parameters to be used in the tool path, thereby resulting in reduced machining time and load.

32 Claims, 19 Drawing Sheets

(51) Int. Cl.
  *B23B 7/12* (2006.01)
  *B23Q 17/22* (2006.01)

(56) References Cited

U.S. PATENT DOCUMENTS

| | | | |
|---|---|---|---|
| 4,680,719 A * | 7/1987 | Kishi | G05B 19/4166 |
| | | | 700/190 |
| 4,907,164 A | 3/1990 | Guyder | |
| 4,975,856 A | 12/1990 | Vold et al. | |
| 5,019,115 A | 5/1991 | Schneider et al. | |
| 5,285,572 A | 2/1994 | Rathi et al. | |
| 5,289,383 A | 2/1994 | Sawamura et al. | |
| 5,444,636 A | 8/1995 | Yoshida et al. | |
| 5,532,933 A | 7/1996 | Nakata | |
| 5,662,566 A | 9/1997 | Marxieser et al. | |
| 5,710,709 A | 1/1998 | Oliver et al. | |
| 5,934,288 A | 8/1999 | Avila et al. | |
| 6,004,489 A | 12/1999 | Huang et al. | |
| 6,266,572 B1 | 7/2001 | Yamazaki et al. | |
| 6,311,098 B1 | 10/2001 | Higasayama et al. | |
| 6,332,385 B1 * | 12/2001 | Kautto | B23B 27/06 |
| | | | 82/47 |
| 6,369,815 B1 | 4/2002 | Celniker et al. | |
| 6,428,252 B1 | 8/2002 | Oldani | |
| 6,438,445 B1 | 8/2002 | Yoshida et al. | |
| 6,447,223 B1 | 9/2002 | Farah et al. | |
| 6,535,788 B1 | 3/2003 | Yoshida et al. | |
| 6,591,158 B1 | 7/2003 | Bieterman et al. | |
| 6,678,575 B1 | 1/2004 | Graham et al. | |
| 6,745,100 B1 | 6/2004 | Lermuzeaux | |
| 6,772,039 B2 | 8/2004 | Kakino et al. | |
| 6,823,230 B1 | 11/2004 | Jamalabad et al. | |
| 6,824,336 B2 | 11/2004 | Izutsu et al. | |
| 6,895,299 B2 | 5/2005 | Red et al. | |
| 6,942,436 B2 | 9/2005 | Kakino et al. | |
| 6,999,843 B2 | 2/2006 | Matsumoto et al. | |
| 7,069,108 B2 | 6/2006 | Saarela et al. | |
| 7,070,368 B2 | 7/2006 | Murakami et al. | |
| 7,269,471 B2 | 9/2007 | Kadono | |
| 7,287,939 B2 | 10/2007 | Koch | |
| 7,451,013 B2 | 11/2008 | Coleman et al. | |
| 7,577,490 B2 | 8/2009 | Diehl et al. | |
| 7,593,786 B2 | 9/2009 | Saarela et al. | |
| 7,797,652 B2 | 9/2010 | Monkowski et al. | |
| 7,831,332 B2 | 11/2010 | Diehl | |
| 8,265,783 B2 | 9/2012 | Saito | |
| 8,295,972 B2 | 10/2012 | Coleman et al. | |
| 8,489,224 B2 | 7/2013 | Berman et al. | |
| 8,560,113 B2 | 10/2013 | Diehl et al. | |
| 8,880,212 B2 | 11/2014 | Coleman et al. | |
| 9,489,339 B2 | 11/2016 | Mackman | |
| 9,569,868 B2 | 2/2017 | Sud et al. | |
| 9,690,282 B2 | 6/2017 | Berman et al. | |
| 9,817,390 B2 * | 11/2017 | Holt | G05B 19/4163 |
| 9,946,245 B2 | 4/2018 | Sherbrooke et al. | |
| 10,005,130 B2 * | 6/2018 | Ishihara | B23B 5/36 |
| 10,022,833 B2 | 7/2018 | Sherbrooke et al. | |
| 11,819,924 B2 * | 11/2023 | Fujise | B23B 1/00 |
| 2001/0048857 A1 | 12/2001 | Koch | |
| 2005/0126352 A1 | 6/2005 | Suh et al. | |
| 2005/0160887 A1 * | 7/2005 | Erickson | B23B 27/16 |
| | | | 82/121 |
| 2005/0168839 A1 * | 8/2005 | Kimura | B23B 1/00 |
| | | | 359/742 |
| 2005/0209730 A1 | 9/2005 | Grund et al. | |
| 2005/0234586 A1 | 10/2005 | Agapiou et al. | |
| 2005/0246052 A1 | 11/2005 | Coleman et al. | |
| 2005/0251284 A1 | 11/2005 | Balic | |
| 2005/0256604 A1 | 11/2005 | Diehi et al. | |
| 2006/0042091 A1 * | 3/2006 | Luschei | B23B 1/00 |
| | | | 29/894.35 |
| 2006/0111019 A1 * | 5/2006 | Hyatt | B23B 27/14 |
| | | | 451/6 |
| 2006/0167668 A1 | 7/2006 | Cariveau et al. | |
| 2006/0291969 A1 | 12/2006 | Koch | |

| | | | |
|---|---|---|---|
| 2007/0091094 A1 | 4/2007 | Hong et al. | |
| 2007/0199414 A1 * | 8/2007 | Dixon | G05B 19/4065 |
| | | | 82/118 |
| 2008/0058982 A1 | 3/2008 | Gray | |
| 2008/0107491 A1 | 5/2008 | Osburn | |
| 2008/0235641 A1 | 9/2008 | Allen | |
| 2008/0269943 A1 | 10/2008 | Diehl et al. | |
| 2009/0312993 A1 | 12/2009 | Drumheller et al. | |
| 2010/0120337 A1 * | 5/2010 | Kuriyama | B23Q 5/28 |
| | | | 451/28 |
| 2010/0260569 A1 | 10/2010 | Ham et al. | |
| 2010/0272521 A1 * | 10/2010 | Wimberley | B23B 29/04 |
| | | | 407/91 |
| 2010/0274381 A1 | 10/2010 | Gray et al. | |
| 2011/0150592 A1 | 6/2011 | Diehl et al. | |
| 2011/0169828 A1 | 7/2011 | Pedersen | |
| 2011/0190922 A1 | 8/2011 | Walker et al. | |
| 2011/0197723 A1 * | 8/2011 | Sjoo | B23B 27/14 |
| | | | 82/131 |
| 2011/0251715 A1 | 10/2011 | Diehl et al. | |
| 2012/0160635 A1 | 6/2012 | Ooe | |
| 2012/0290271 A1 | 11/2012 | Diguet | |
| 2013/0218319 A1 * | 8/2013 | Holt | B23Q 15/12 |
| | | | 82/1.11 |
| 2014/0297021 A1 | 10/2014 | Aggarwal et al. | |
| 2017/0100777 A1 * | 4/2017 | Lof | B23B 27/164 |
| 2018/0029134 A1 * | 2/2018 | Klose | B23B 5/00 |
| 2018/0257145 A1 * | 9/2018 | Kanada | G05B 19/4093 |
| 2021/0023608 A1 * | 1/2021 | Inatani | B60B 3/00 |
| 2023/0012457 A1 * | 1/2023 | Brake | G05B 19/40935 |
| 2023/0305521 A1 * | 9/2023 | Watanabe | G05B 19/40931 |
| 2025/0303473 A1 * | 10/2025 | Hoshi | B23B 1/00 |

FOREIGN PATENT DOCUMENTS

| | | | | |
|---|---|---|---|---|
| DE | 102009032448 A1 * | 1/2010 | | B23B 1/00 |
| EP | 1008408 A2 * | 6/2000 | | B23B 27/007 |
| EP | 3153260 | 4/2017 | | |
| EP | 3536425 | 9/2019 | | |
| EP | 3536428 | 11/2019 | | |
| EP | 3702854 | 9/2020 | | |
| JP | 2003-071601 | 3/2003 | | |
| JP | 2004344994 A * | 12/2004 | | B29C 33/424 |
| JP | 2010003018 | 1/2010 | | |
| KR | 10-2016-0109797 | 9/2016 | | |
| WO | WO-8401730 A * | 5/1984 | | B23B 1/00 |
| WO | WO-0015372 A1 * | 3/2000 | | B23B 1/00 |
| WO | WO-2015079836 A1 * | 6/2015 | | B23B 1/00 |
| WO | WO-2016093300 A1 * | 6/2016 | | B23B 1/00 |
| WO | 2021118603 | 6/2021 | | |

OTHER PUBLICATIONS

"Adaptive Clearing: The missing strategy for ; roughing," <www.freesteel.co.uk>, 2 pages, May 7, 2000.

Asakawa et al. "Automation of Chamfering by an Industrial Robot for the Case of Hole on a Free Cured Surface" Journal of Robotics and Computer-Integrated Manufacturing, Oct. 2002, 7 pages.

Brandt, et al., "Continuous Skeleton Computation by Voronoi Diagram," CVGIP: Image Understanding, May 1992, pp. 329-338, vol. 55, No. 3.

Choy, et al., "A corner-looping based tool path for pocket milling," Computer-Aided Design, Feb. 2003, pp. 155-166, vol. 35, No. 2.

Elber, et al., "MATHSM: Medial Axis Transform toward High Speed Machining of Pockets," Dec. 31, 2003, 16 pages.

Held, et al., "A smooth spiral tool path for high speed machining of 2D pockets," Computer-Aided Design, Jul. 2009, pp. 539-550, vol. 41, No. 7.

Held, et al., "Pocket machining based on contour-parallel tool paths generated by means of proximity maps," Computer-Aided Design, Mar. 1994, pp. 189-203, ; vol. 26, No. 3.

Held, M., "Appendix A, Bibliography," On the Computational Geometry of Pocket Machining, 1991, pp. 147-180, Springer-Verlag, Germany.

Held, M., "Chapter 1: Introduction," On the Computational Geometry of Pocket Machining, 1991, pp. 1-16, Springer-Verlag, Germany.

(56)                    References Cited

OTHER PUBLICATIONS

Held, M., "Chapter 10: Generating the Tool Path," On the Computational Geometry of Pocket Machining, 1991, pp. 139-146, Springer-Verlag, Germany.

Held, M., "Chapter 2: Survey of Contour-parallel Milling," On the Computational Geometry of Pocket Machining, 1991, pp. 17-36, Springer-Verlag, Germany.

Held, M., "Chapter 3: Survey of Direction-parallel Milling," On the ; Computational Geometry of Pocket Machining, 1991, pp. 37-52, Springer-Verlag, Germany.

Held, M., "Chapter 4: Preliminaries," On the Computational Geometry of Pocket Machining, 1991, pp. 53-60, Springer-Verlag, Germany.

Held, M., "Chapter 5: Computing Voronoi Diagrams," On the Computational Geometry of Pocket Machining, 1991, pp. 61-88, Springer-Verlag, Germany.

Held, M., "Chapter 6: Implementation Issues," On the Computational Geometry of Pocket Machining, 1991, pp. 89-101, Springer-Verlag, Germany.

Held, M., "Chapter 7: The Concept of Monotonous," On the ; Computational Geometry of Pocket Machining, 1991, pp. 103-114, Springer-Verlag, Germany.

Held, M., "Chapter 8: Generating the Tool Path," On the Computational Geometry of Pocket Machining, 1991, pp. 115-126, Springer-Verlag, Germany.

Held, M., "Chapter 9: Constructing the Mesh," On the Computational Geometry of Pocket Machining, 1991, pp. 127-137, Springer-Verlag, Germany.

Held, M., "Foreword, Table of Contents," On the ; Computational Geometry of Pocket Machining, 1991, 10 pages, Springer-Verlag, Germany.

Ibaraki, et al., "Tool Path Planning Using Trochoid Cycles for Hardened Steel in Die and Mold Manufacturing (1st Report), Tool Path Generation for Trochoid Cycles Based on Voronoi Diagram," Advances in Agile Manufacturing—ICAM 2003, 2003, pp. 435-442, China Machine Press.

Jeong et al., "Tool Path Generation for Machining Free-Form Pockets Using Voronoi Diagrams," The International Journal of Advanced Manufacturing Technology, vol. 14, Issue 12, 1998, pp. 876-881.

Klocke et al., "Integrated Approach for Knowledge-Based Process Layout for Simultaneous 5-Axis Milling of Advanced Materials," Hindawi Publishing Corporation, vol. 52, No. 2, Jan. 1, 2011, 7 pages.

Kramer, Thomas R., "Pocket Milling with Tool Engagement Detection," cover page and pp. 1-16, Apr. 4, 1991.

Lai et al., "Incremental algorithms for finding the offset distance and minimum passage width in a pocket machining toolpath using Voronoi technique," Journal of Materials Processing Technology, 100, 2000, 6 pages.

Lambregts, et al., "An efficient automatic tool path generator for 2 ½ D free-form pockets," Computers in Industry, Aug. 1996, pp. 151-157, vol. 29, No. 3.

Li et al., entitled "Tool Path Generation for Triangular Meshes Using Least-Squares Conformal Map," Taylor and Francis, International Journal of Production Research, vol. 49, No. 12, Jun. 2011, 15 pages.

Persson, H., "NC machining of arbitrarily shaped pockets," Compter-Aided Design, May 1978, pp. 169-174, vol. 10, No. 3.

Salman, et al., "Voronoi diagram-based tool path compensations for removing uncut material in 2 ½ D pocket machining," Computer-Aided Design, Mar. 2006, pp. 194-209, vol. 38, No. 3.

Sinumerik—Hindawi, "Milling with Sinumerik Mold Making with 3 to 5-axis simultaneous milling," Siemens AG, Feb. 16, 2012, 129 pages.

Stori, et al., "Constant Engagement Tool Path ; Generation for Convex Geometries," J. Mfg. Systems, 19:3; ABI/INFORM Global 2000.

Tsai, et al., "Operation Planning Based on Cutting Process Models," Annals of the CIRP, 1991, pp. 95-98, vol. 40, No. 1.

Vona, et al., "Voronoi toolpaths for PCB mechanical etch: Simple and intuitive algortihms with the 3D GPU," Proceedings of the 2005 IEEE International Conference on vol. Apr. 2005, 8 pages.

Wang, et al., "A Metric-Based Approach to 2D Tool-Patah Optimization for High-Speed Machining," 9 pages.

Yamaji, et al., "Tool Path Planning Using Trochoid Cycles for Hardened Steel in Die and Mold Manufacturing (2nd Report), Tool Path Planning to Avoid an Excessive Tool Load," Advances in Agile Manufacturing—ICAM 2003, 2003, pp. 443-450, China Machine Press.

Yao, Z., "A Novel Cutter Path Planning Approach to High Speed Machining," Computer-Aided Design & Applications, 2006, pp. 241-248, vol. 3, Nos. 1-4.

European Extended Search Report and Written Opinion for European Patent Application No. 22853666.0, Applicant: Celeritive Technologies, Inc., mailed Jul. 25, 2025, 9 pages.

* cited by examiner

604

608

606

602

1800

METHODS FOR PREVENTING NOTCH FORMATION IN, AND/OR EXTENDING THE USEFUL LIFE OF, CUTTING TOOLS FOR TURNING, AND ASSOCIATED SYSTEMS

CROSS-REFERENCE TO RELATED APPLICATION

The present application claims priority to U.S. Provisional Patent Application 63/229,486, filed on Aug. 4, 2021 and incorporated herein by reference.

BACKGROUND

Numerically controlled (NC) turning involves various techniques for removing material from a workpiece to create an object of a particular shape and with defined dimensions. In NC turning, a lathe or turning center (hereinafter, "lathe") generally drives one or more cutting tools along one or more programmed paths, known as tool paths.

The material removal process on a lathe involves revolving a workpiece around an axis of rotation, typically the z-axis, while simultaneously moving a non-revolving cutting tool in a plane defined by the z-axis and a perpendicular axis, typically the x-axis. Since the workpiece is revolving, or turning, around the axis of rotation, the material removal process on a lathe is commonly referred to as "turning." During NC turning, a lathe generally drives one or more cutting tools along a programmed path, known as a tool path. The fully turned shapes produced by the engagement of the non-rotating cutting tool with the rotating workpiece are always circular if viewed in a cross-section that is perpendicular to the axis of rotation.

While conventional lathes provide many useful functions, there remains a need for lathe tooling and process steps that are more reliable and less labor-intensive, particularly for high value, high temperature, high strength materials, e.g., those used for turbine engines.

DETAILED DESCRIPTION

1. Glossary of Selected Terms

Unless indicated expressly otherwise, the following terms have the meanings indicated below.

Part: a geometric definition, either 2D or 3D, of the part that will be machined. The part definition typically remains unchanged throughout the machining process.

Material: a geometric definition, either 2D or 3D, of the workpiece from which the part will be machined. The part and material may be coincident at some locations, but the part is otherwise wholly contained within the material.

Floor: a target depth to which the insert will cut, e.g., a construction line.

Insert: the portion of a cutting tool that actively engages with the workpiece to cause material removal.

Cutting tool: the assembly of an insert along with one or more mechanical components that hold the insert in place and present the insert to the workpiece.

Above the floor: the side of the floor where the cutting tool is, regardless of the real-world orientation of the workpiece.

Below the floor: the side of the floor opposite of where the cutting tool is, regardless of the real-world orientation of the workpiece.

Descending cut: a cut that travels from above the floor in a direction towards the floor.

Cross section view: a 2D view of the intersection between the workpiece and the plane defined by the z and x axes of the lathe.

2. Introduction

Figure 1:
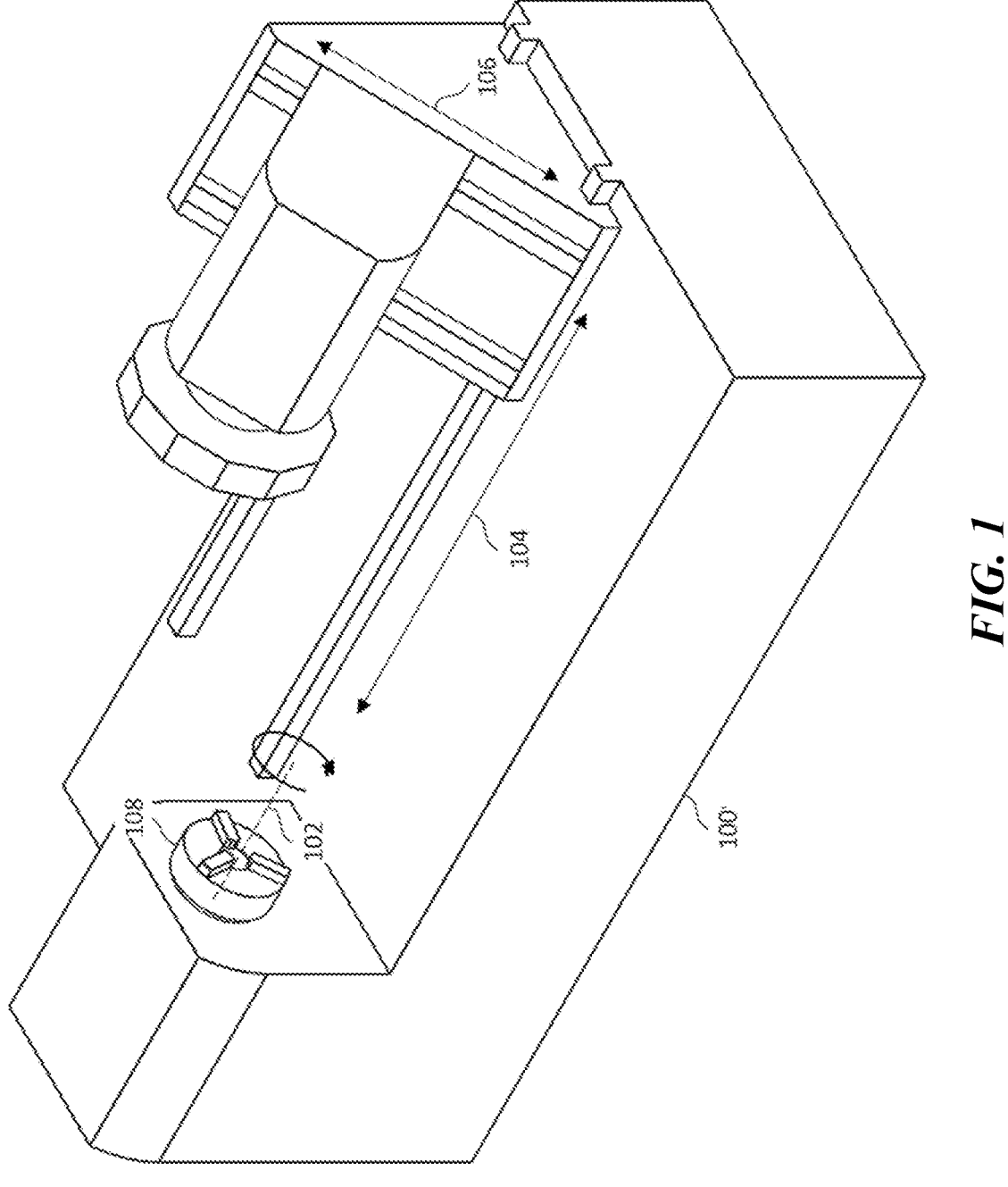
FIG. 1 is an angled-view schematic diagram illustrating a simple model of a 2-axis lathe, which can support tooling and methods in accordance with the present technology.

Lathes are available in numerous configurations, with various numbers of axes of motion, spindles, sub-spindles, tool turrets, etc. FIG. 1 is an angled-view schematic diagram illustrating an example of a lathe 100. The lathe 100 rotates a workpiece (not shown) around an axis of rotation 102. At the same time, the lathe moves a non-rotating cutting tool along a z-axis 104 (parallel to the axis of rotation 102), and/or along a radial axis that is perpendicular to the axis of rotation (typically the x-axis) 106. This is the basic configuration of a 2-axis lathe. The lathe shown in FIG. 1 is classified as a horizontal lathe because its z-axis is oriented horizontally. A lathe with its z-axis oriented vertically is often used when turning larger workpieces, since gravity helps hold the workpiece more securely in the chuck 108. Such lathes are commonly known as vertical lathes, or vertical turret lathes (VTLs). A turning tool path intended for such a machine typically includes a series of x and z coordinates that instruct the lathe to move the cutting tool accordingly along the x and z axes.

Figure 2:
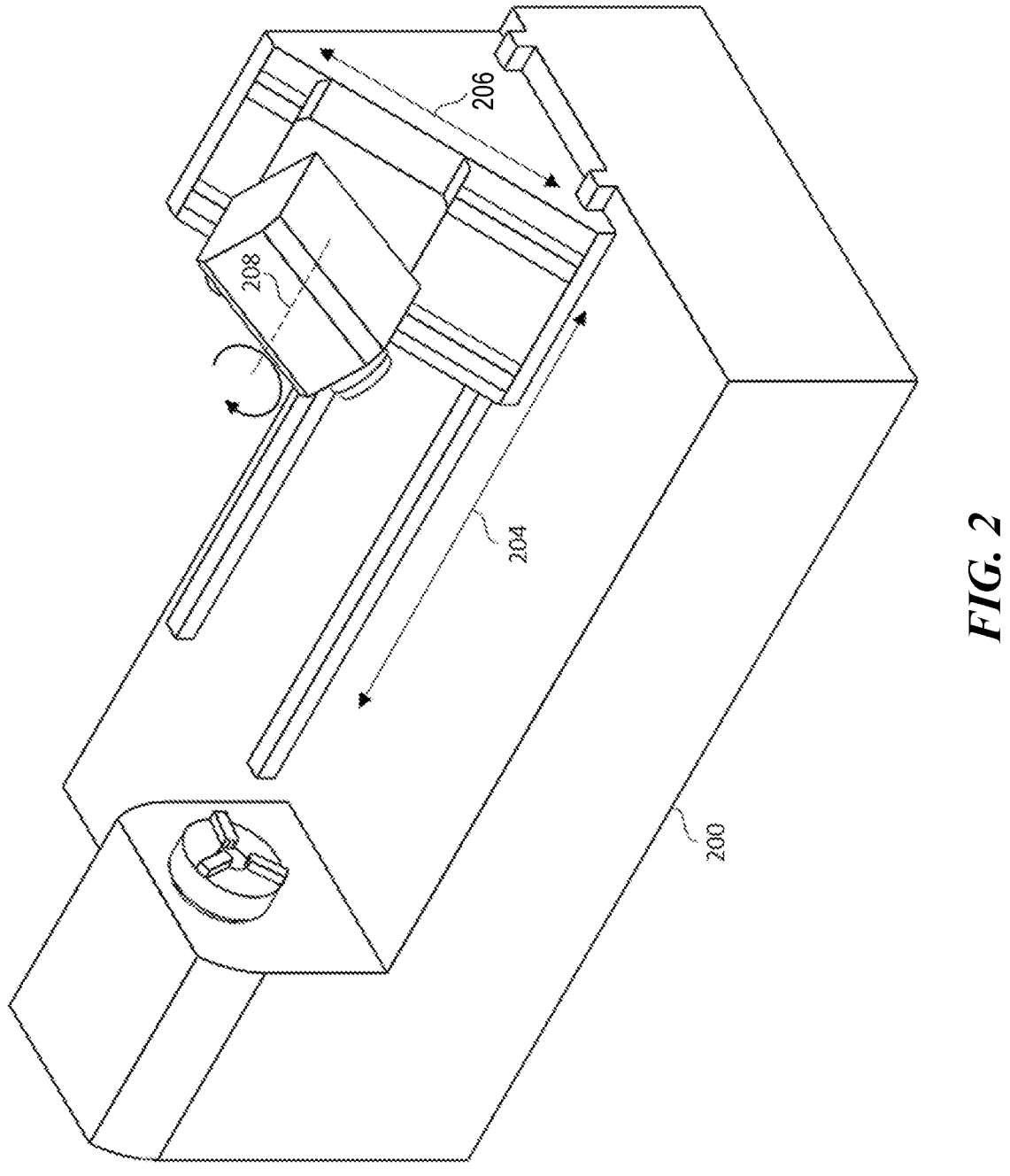
FIG. 2 is an angled-view schematic diagram illustrating a simple model of a 3-axis lathe, which can support tooling and methods in accordance with the present technology.

More advanced lathes include not only linear axes as just described, but also rotational axes that can, for example, control the orientation of the tool with respect to the workpiece. FIG. 2 is an angled-view schematic diagram illustrating an example of a 3-axis lathe 200. In addition to the two linear axes 204 and 206 (the z-axis and the x-axis, respectively), the machine 200 can enable a cutting tool to rotate around a b-axis 208. The ability to rotate the cutting tool about the b-axis 208 can be used to simply orient the cutting tool at a fixed angle with respect to the workpiece, or it can be used to dynamically rotate the tool around the b-axis 208 while cutting.

Due to the always-revolving workpiece, the part shapes that result from the turning process have more characteristics in common with each other than, say, parts that are milled. Further, the general material configurations of a portion of the workpiece that is to be removed fall generally into one of three different categories.

Figure 3:
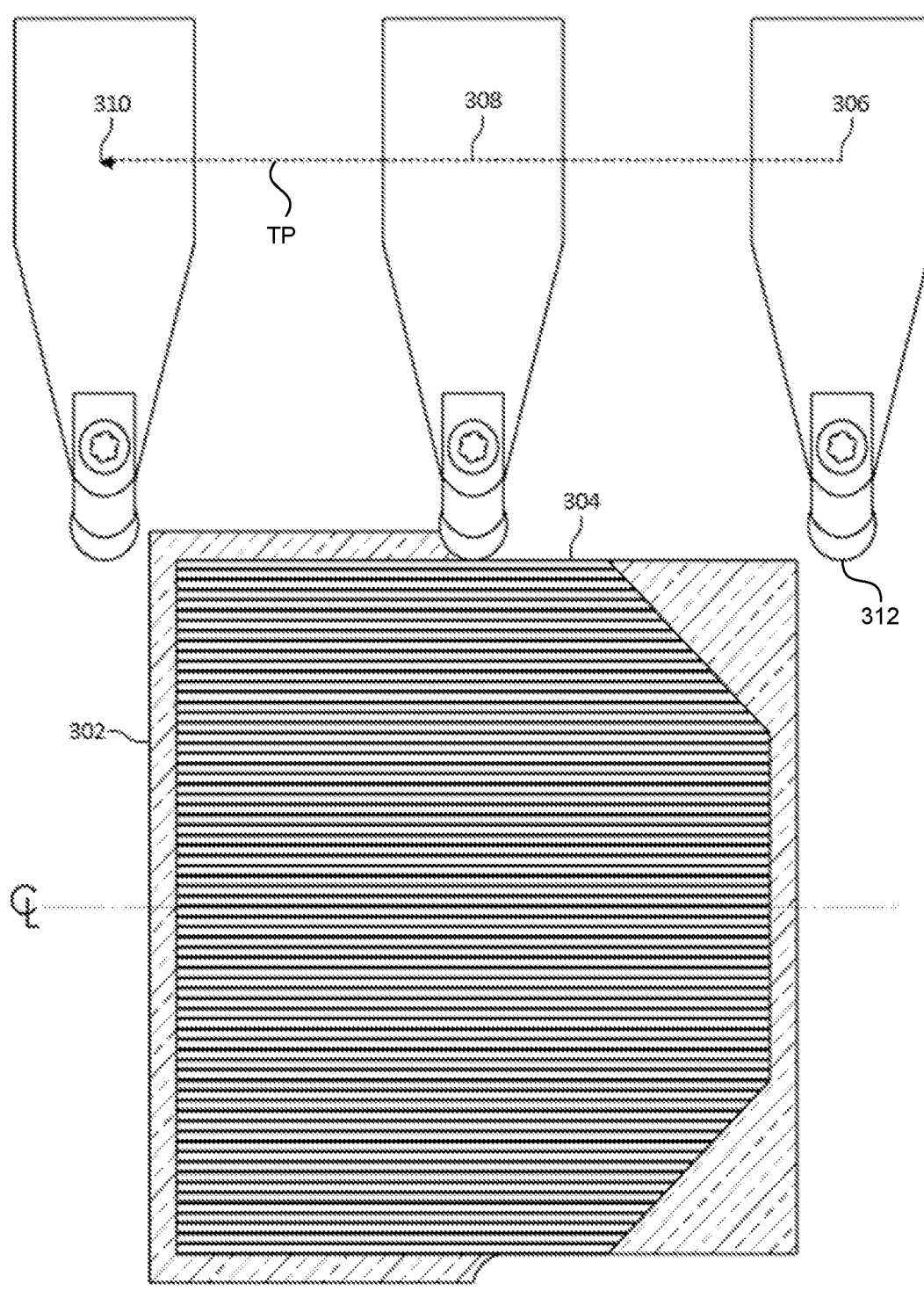
FIG. 3 is a cross section view diagram illustrating a cutting tool performing a single cutting pass on a workpiece exhibiting a face configuration.

One category is commonly referred to as a "face." The primary characteristic of a face is that a cutting tool 312 can enter the material to be removed at one edge and exit the material at an opposite edge. FIG. 3 shows one representative face configuration, where the material to be removed 302 is shown in a light hatch pattern, and the portion of the workpiece 304 which must not be cut (hereafter called the "part") is shown in a darker hatch pattern. The tool path is indicated by dotted line TP, which shows that the tool 312 enters the material at position 306, proceeds through the material to position 308 and exits at position 310 on the opposite edge.

Figure 4:
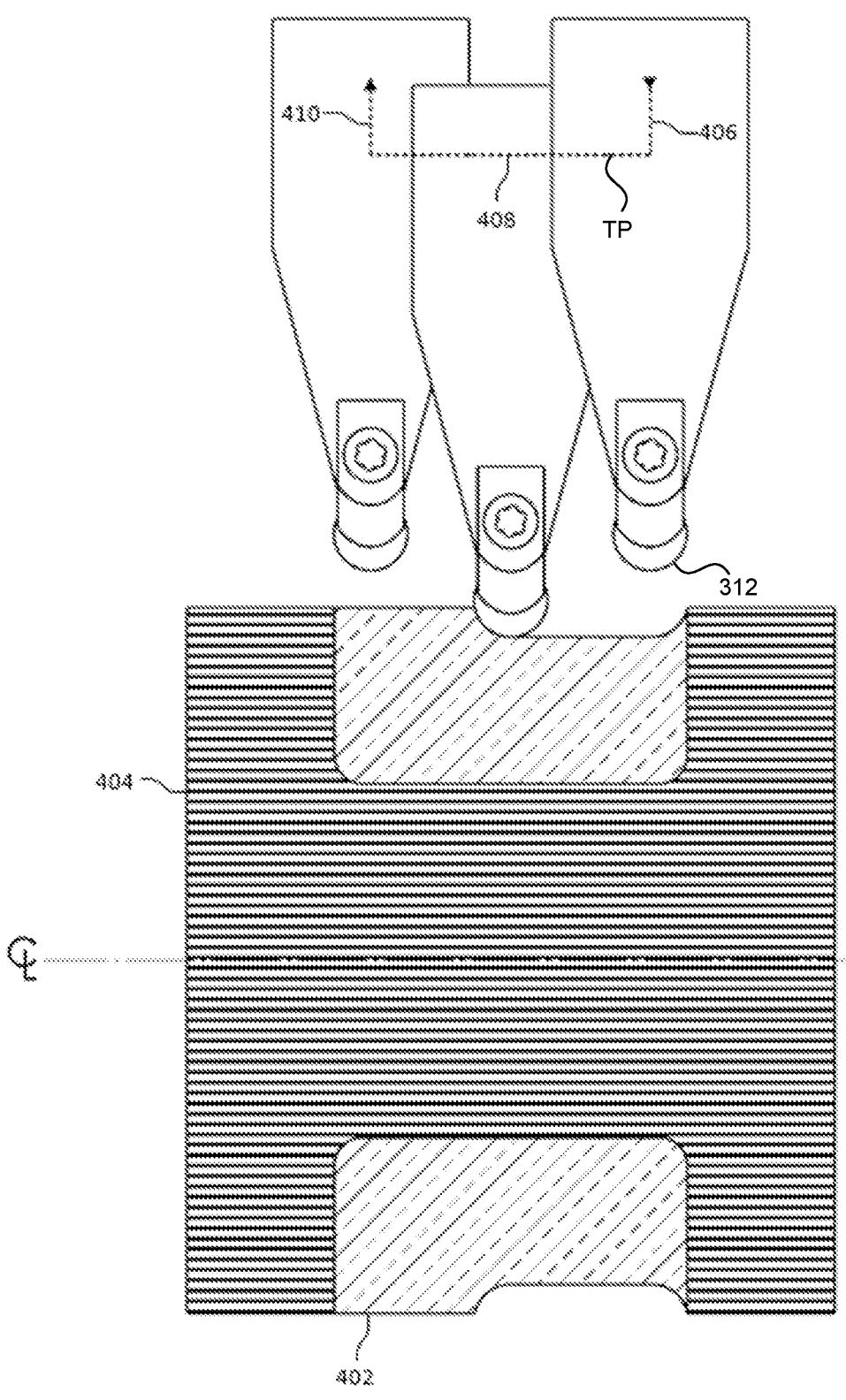
FIG. 4 is a cross section view diagram illustrating a cutting tool performing a single cutting pass on a workpiece exhibiting a pocket configuration.

A second category is commonly referred to as a "pocket," or sometimes a "hollow," "recess," or other name(s) (hereinafter "pocket"). A key characteristic of a pocket is that the cutting tool is required to exit the material through substantially the same edge through which it entered the material in order to avoid cutting the part. FIG. 4 shows an example of a pocket, with the material to be removed 402 shown in a light hatch pattern, and the part 404 shown in a darker hatch pattern. The tool 312 enters at position 406, proceeds through the material to position 408, and exits at position 410.

Figure 5:
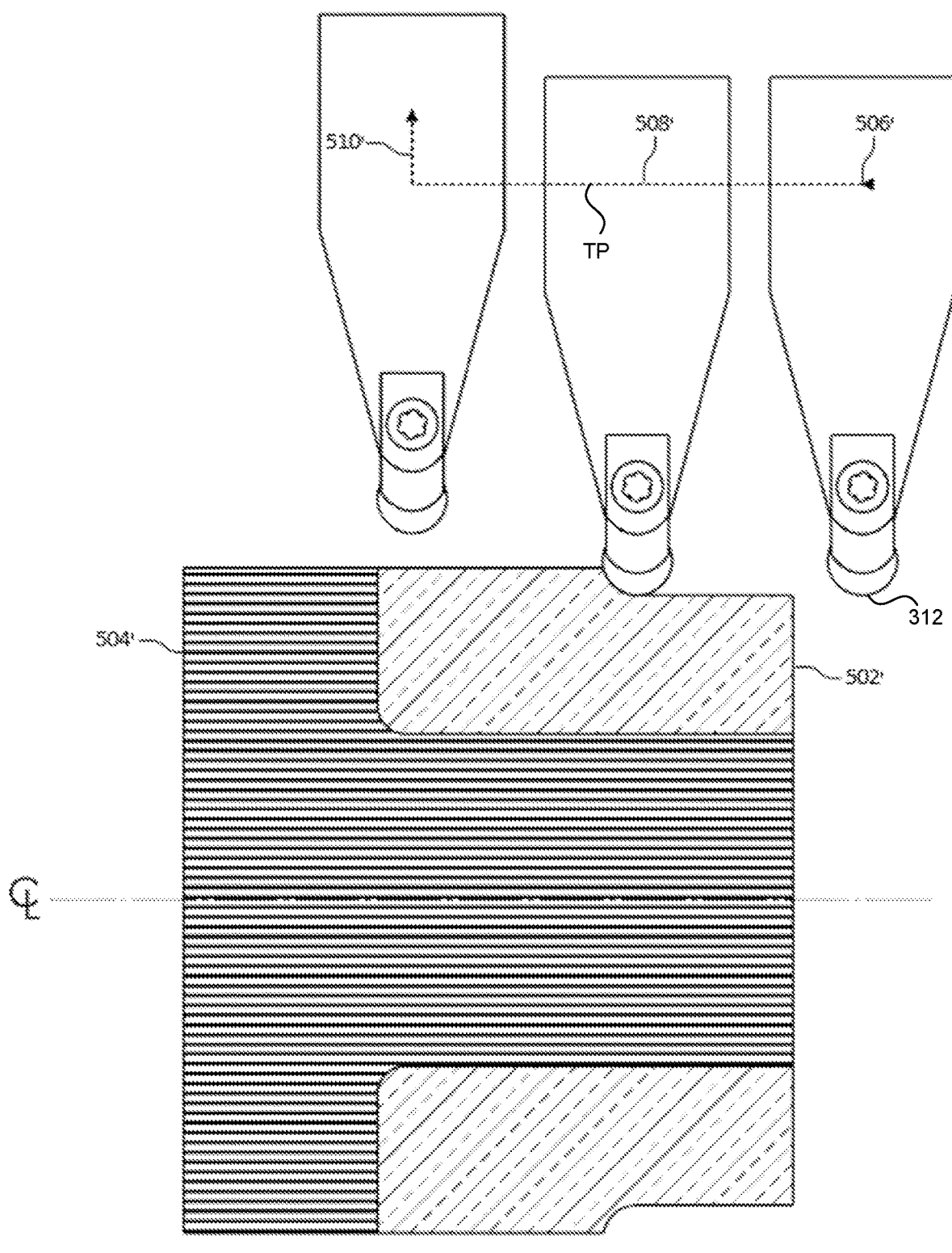
FIG. 5 is a cross section view diagram illustrating a cutting tool performing a single cutting pass on a workpiece exhibiting a shoulder configuration.

A third category is commonly referred to as a "shoulder." A defining characteristic of a shoulder is that the cutting tool 312 enters through one edge of the material and then exits the material through an edge of the material that is generally adjacent to the edge through which it entered the material. FIG. 5 shows an example of a shoulder, with the material to be removed 502 shown in a light hatch pattern, and the part 504 shown in a darker hatch pattern. The tool enters at position 506, proceeds through the material to position 508, and exits at position 510.

Figure 6A:
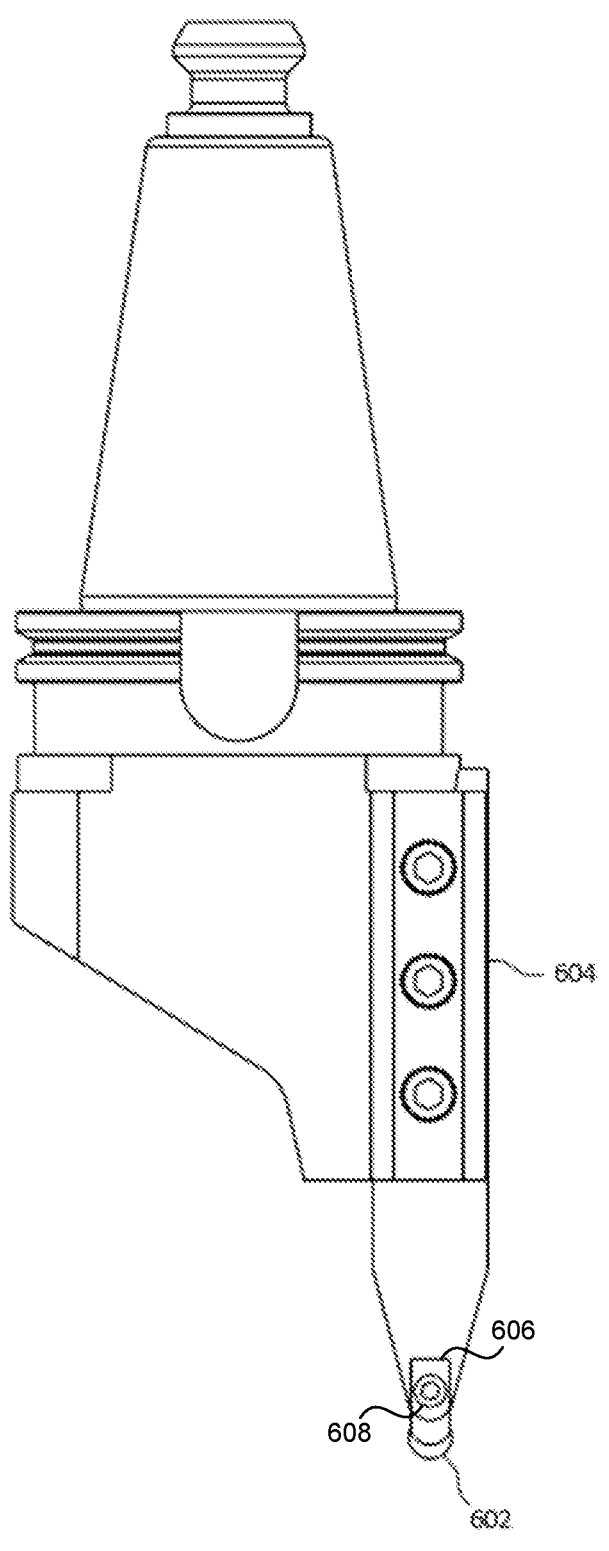
FIGS. 6A and 6B illustrate a cutting tool for a lathe, comprising a holder and an insert configured in accordance with embodiments of the present technology.
Figure 6B:
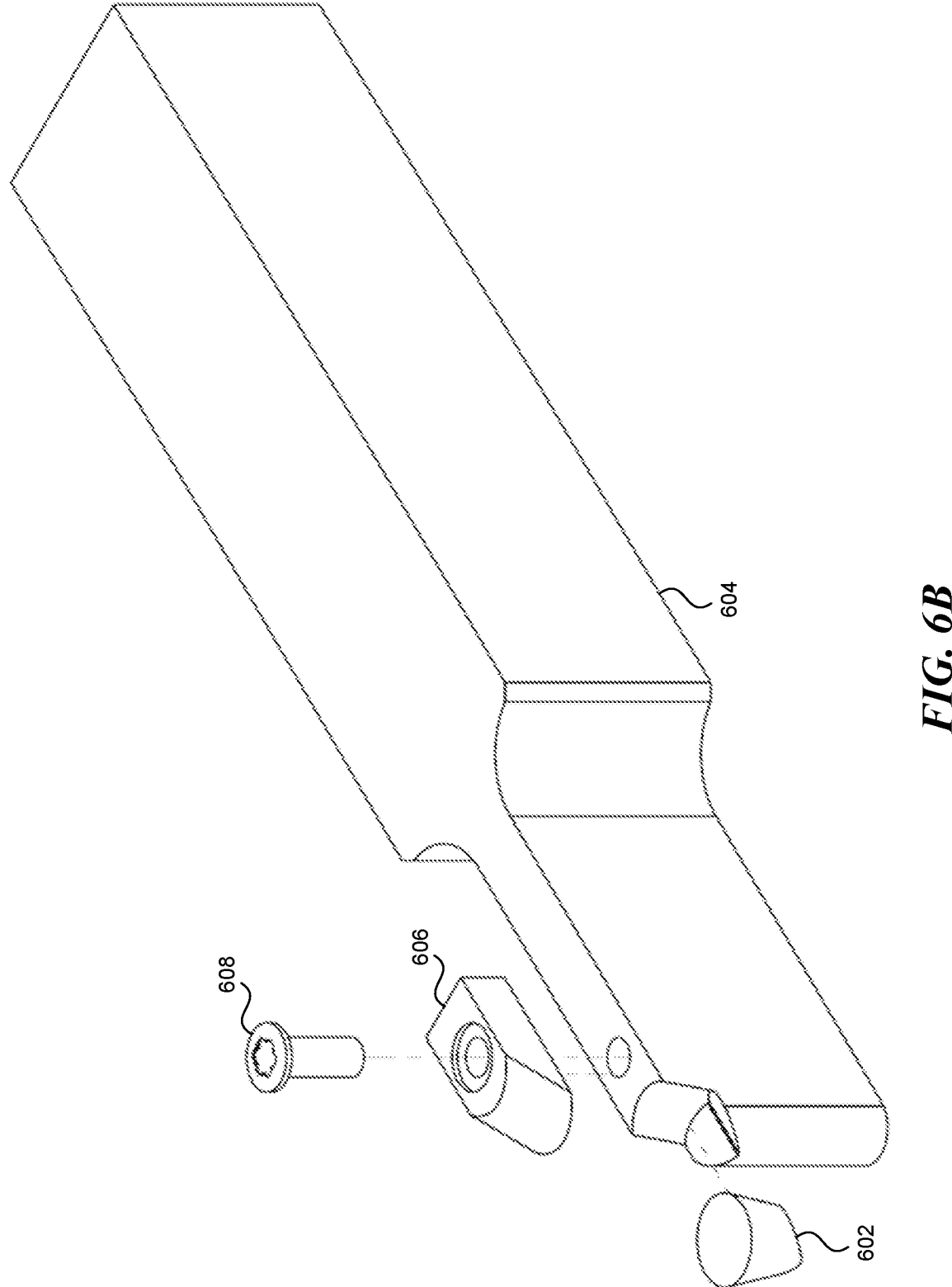

A cutting tool in the world of turning can take many forms, including but not limited to a high-speed steel tool bit, perhaps ground into a specific shape, a steel bit with a piece of carbide cemented to it, and custom-ground form tools. But the most commonly used tools include an insert that is held in an insert holder. It is the insert that does the actual cutting of the material, and is often made, unexclusively, of Carbide, CBN (Cubic Boron Nitride), Diamond, or Ceramic compounds. The insert holder may be an assembly of mechanical components that keep the insert in place and establish the insert's presentation to the workpiece. FIGS. 6A and 6B show an example of an insert 602 attached to a tool holder 604 with a clamp 606 and a screw 608. Hereinafter the term "cutting tool" generally refers to the combination of an insert and a tool holder, and the term "insert" generally refers to the insert itself, e.g., to the portion of the cutting tool that contacts the workpiece and removes material from the workpiece. This element may also be referred to more generally as a "material removal element," and can be supported in any number of suitable manners, including but not limited to those shown in FIGS. 6A and 6B. Accordingly, the insert/holder combination, such as that in FIGS. 6A and 6B, is referenced throughout for clarity and consistency, but any suitable manifestation of cutting tool having one or more cutting edges and/or cutting surfaces are within the scope of the present technology.

The turning process is used to machine a wide variety of parts in a wide variety of materials for a wide variety of industries and applications. There is a particular class of parts, however, that presents specific and significant challenges to manufacturers. These parts are required to function in extremely difficult conditions, operating at high speeds, at high temperatures, under high pressure, for extended periods of time. One example of this class is the family of parts in a jet engine, such as engine spools and turbine discs, where the operating conditions are extreme, and part failure is catastrophic, potentially resulting in loss of human life. Many such parts must therefore be made from specialized materials that can survive in these harsh conditions. Heat resistant Super Alloys (HRSA) is a term often used to describe such materials. These are often Nickel-, Iron-, or Cobalt-based alloys with commercial names such as Inconel, Monel, Rene, Waspaloy, and others.

HRSA materials are often rough-turned with round, ceramic inserts, since round is generally the strongest insert shape and ceramic inserts can withstand the high temperatures and pressures that result from turning these difficult-to-machine materials. But the ceramic inserts' strength can also be a weakness. While very hard, ceramic inserts are relatively brittle, and therefore subject to damage when engaging the workpiece material at a constant depth of cut, which keeps the pressure at the workpiece edge at a single point on the cutting edge of the insert. This consistent pressure causes a notch to form at the pressure point, and progressively reduces the ability of the insert to cuts, until the tool ultimately fails. Also, ceramic inserts generate significant amounts of heat ahead of the cutting edge, subjecting the workpiece material to a high degree of plastic deformation. This tends to "roll" the material forward, and, if care is not taken when exiting the material, a burr will be produced that can damage the insert during exit or cause a problem when entering the material on a subsequent cut. Perhaps most detrimentally, if the insert strikes a sharp corner upon entering the material the insert can be instantly damaged to the point that cutting cannot continue.

For decades, CAD/CAM (Computer Aided Design/Computer Aided Manufacturing) systems have included the ability to generate tool paths to drive NC lathes to produce turned parts. But these tool paths are almost invariably generic in nature, and not well suited to driving ceramic inserts through HRSA materials. This is so much the case that some NC programmers in the power generation industry rarely use them. Rather, they may create CAD geometry, most often in the form of 2D lines and arcs, that represents the path they wish the cutting tool to follow, and then, painstakingly, "manually" drive the cutting tool along this geometry. This process is time consuming, requires a significant use of manual calculations, and is prone to human error. Further, and perhaps worst of all, is that if a change is required, perhaps due to an engineering change or because a change in cut spacing is required, the manual process must often be completely redone.

As stated above, there remains a need for tools and tool paths that properly engage the workpiece material, properly drive the cutting tool once engaged with the workpiece material, and properly exit the workpiece material for every cut, and/or do so with minimal user interaction required, and/or are automatically and reliably updateable in response to engineering changes or user preferences. Further, such tool paths would utilize the portion of the cutting tool (or insert) exposed to the material as evenly as possible, to increase (e.g., maximize) the useful life of the tool. Such a tool path generator would significantly accelerate the part programming process, produce significantly more effective, consistent, and reliable part programs, and significantly extend the useful life of inserts, particularly ceramic inserts, as well as more completely use the material forming the inserts.

A high-performance turning technology ("the described technology") is described herein. The described technology enables users to turn areas of a part with computer-generated tool paths in a way that extends the useful life of ceramic inserts. Embodiments of the described technology will drive the insert in a way that avoids corner strikes upon material entry, continuously varies the cut depth to avoid forming a notch, and exits the material in a manner that either avoids forming a burr or locates the burr where it will not come into play on subsequent cuts. Embodiments of the described technology can dynamically adjust the cutting feed rate to keep the thickness of the chips within a user-controlled range as the cut depth changes. Due to any one or combination of the above-described attributes, embodiments of the described technology enable the user to employ more aggressive machining parameters than are conventionally used, thereby resulting in reduced machining time and load.

3. Representative Embodiments

FIGS. 1-6B, discussed above, describe basic elements of turning tools and representative turning operations. FIGS. 7-17, discussed below, provide examples of techniques for improving turning operations, in accordance with embodiments of the present technology, and implementable on the tools described above.

Some embodiments of the presently disclosed technology are described below. However, the described technology can be implemented in other embodiments as would be recognized by one skilled in the art.

In some embodiments, a portion of a workpiece in a face configuration is turned on a lathe with a cutting tool. This can be performed by (1) determining a location of a floor within the workpiece; (2) performing a first cut descending towards the floor; (3) performing a second cut descending towards the floor in another direction; and (4) performing a third cut parallel to the floor. The descending cuts shown in the Figures are linear, but those skilled in the art will recognize that this is not a requirement.

Figure 7:
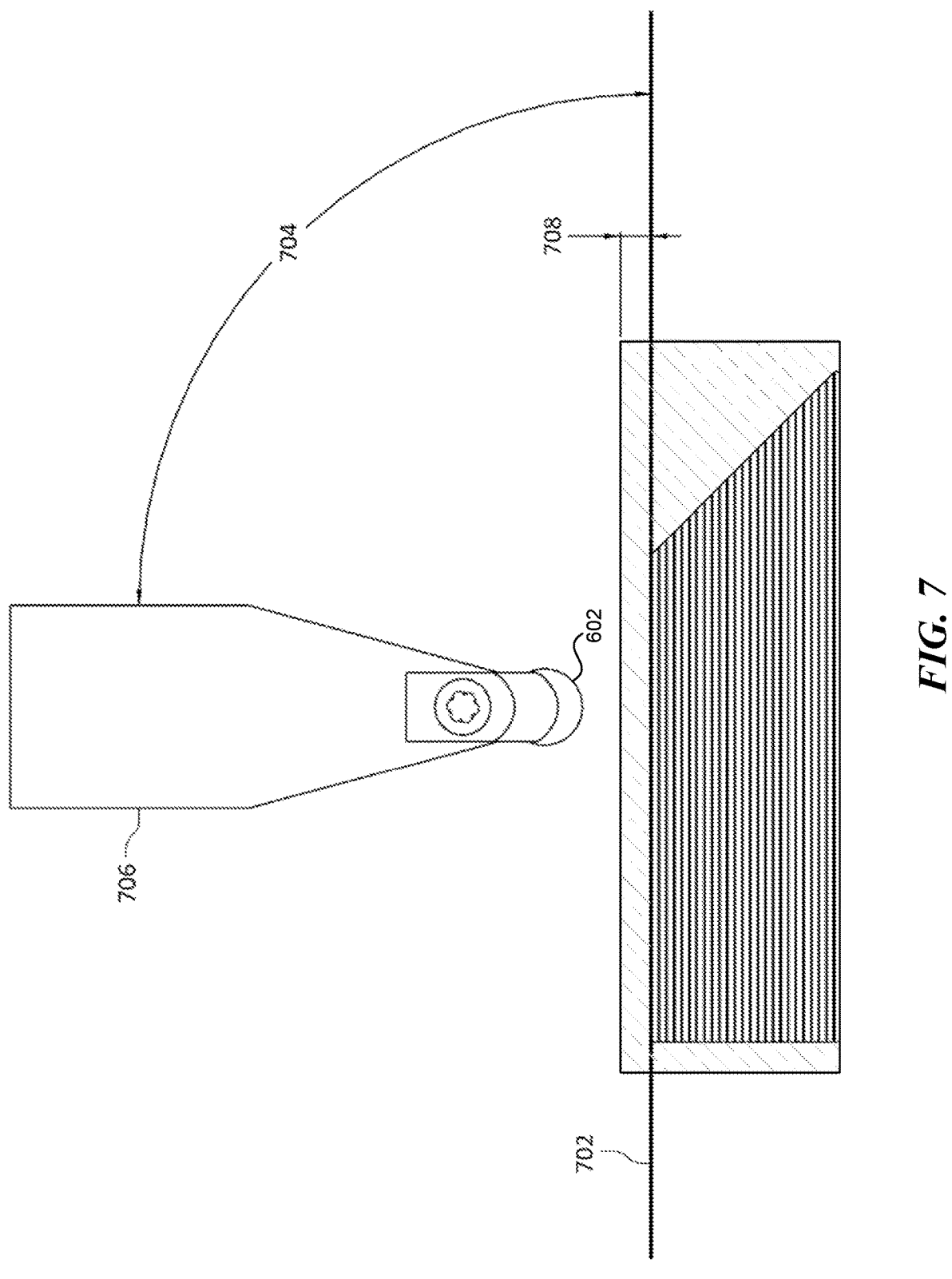
FIG. 7 is a cross section view diagram illustrating a process for determining a floor position inside a workpiece exhibiting a face configuration, in accordance with embodiments of the present technology.

FIG. 7 is a cross section view diagram illustrating a closer view of the workpiece shown in FIG. 3. An infinite line 702, hereinafter referred to as a "floor," is determined. In practice, the line direction is often set to be perpendicular or nearly perpendicular to the angular orientation 704 of the cutting tool 706, but this is not required. The lathe itself may be horizontal, vertical or some other orientation, and the orientation of the cutting tool is not required to be parallel to a machine axis. Also, material may be removed from the internal diameter of the part (often referred to as "boring"), so these terms of art should not be confused with any real-world orientations. The term "vertical axis," as used herein, generally refers to the axis along which the cutting tool is presented to the workpiece, and not a machine axis.

The depth 708 of the floor, measured from the top (or outer edge) of the workpiece, may be determined based on several different considerations. The hardness of the material, the capabilities of the lathe and/or the cutting tool, and the size of the insert 602 itself may all contribute to defining the upper bounds of the floor depth. Ultimately, the user has control over the location of the floor. In addition, the part itself may determine the maximum depth of the floor, as the part may not protrude above the floor.

Figure 8:
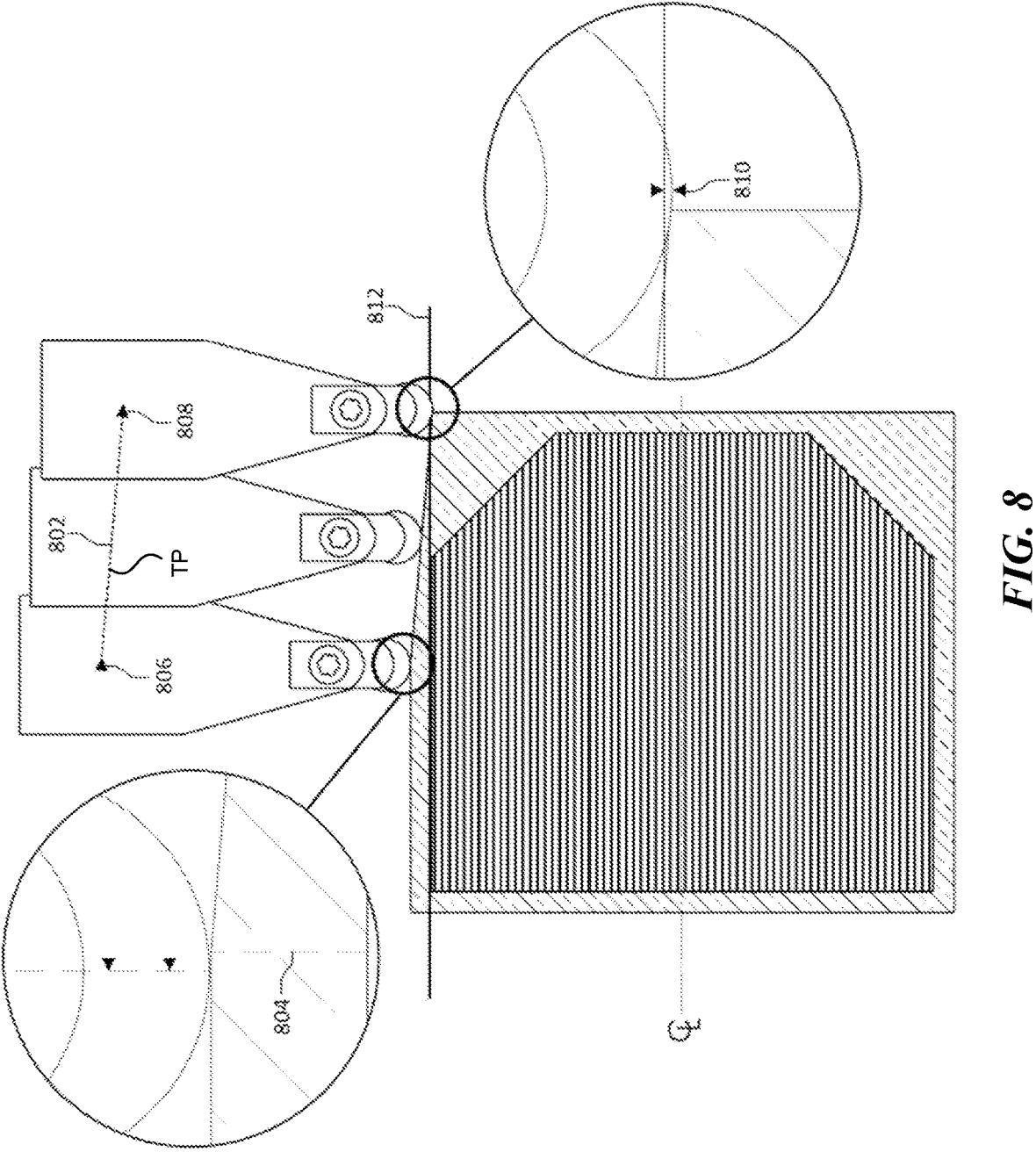
FIG. 8 is a cross section view diagram illustrating a first descending cut into a workpiece exhibiting a face configuration, in accordance with embodiments of the present technology.

FIG. 8 is a cross section view diagram showing the tool path TP for a first cut 802 descending from above the workpiece towards the floor. The direction of the cut is made left-to-right in the diagram, but right-to-left is also possible. The following discussion of a left-to-right cut applies equally to a right-to-left cut except that everything is mirrored with respect to a vertical axis. For a left-to-right cut, the endpoints are typically determined by starting the cut above the workpiece and to the left of an axis 804 which bisects the workpiece into two approximately equal halves. During the course of its motion, the center of the tool proceeds along the tool path TP, which includes a first or start point 806 and a second or end point 808, where a portion 810 of the tool extends below the floor level 812 and is no longer in contact with the material. Accordingly, as used herein, the terms "start point" and "end point" refer to points along the tool path TP that define a segment of the overall tool path, but it is to be understood that the tool may (and typically does) travel some distance before reaching the start point, and after reaching the end point.

By allowing the tool to penetrate past the floor level, two important elements of the present technology can be achieved. First, a potential burr formed by the execution of the cutting pass will be located fully below the floor level. Second, the in-process workpiece develops an angle on the right side, thus ensuring that a future cut at floor level will not encounter a corner strike. Put another way, the cutting tool can exit the workpiece at an angle that is non-parallel to the floor.

Figure 9:
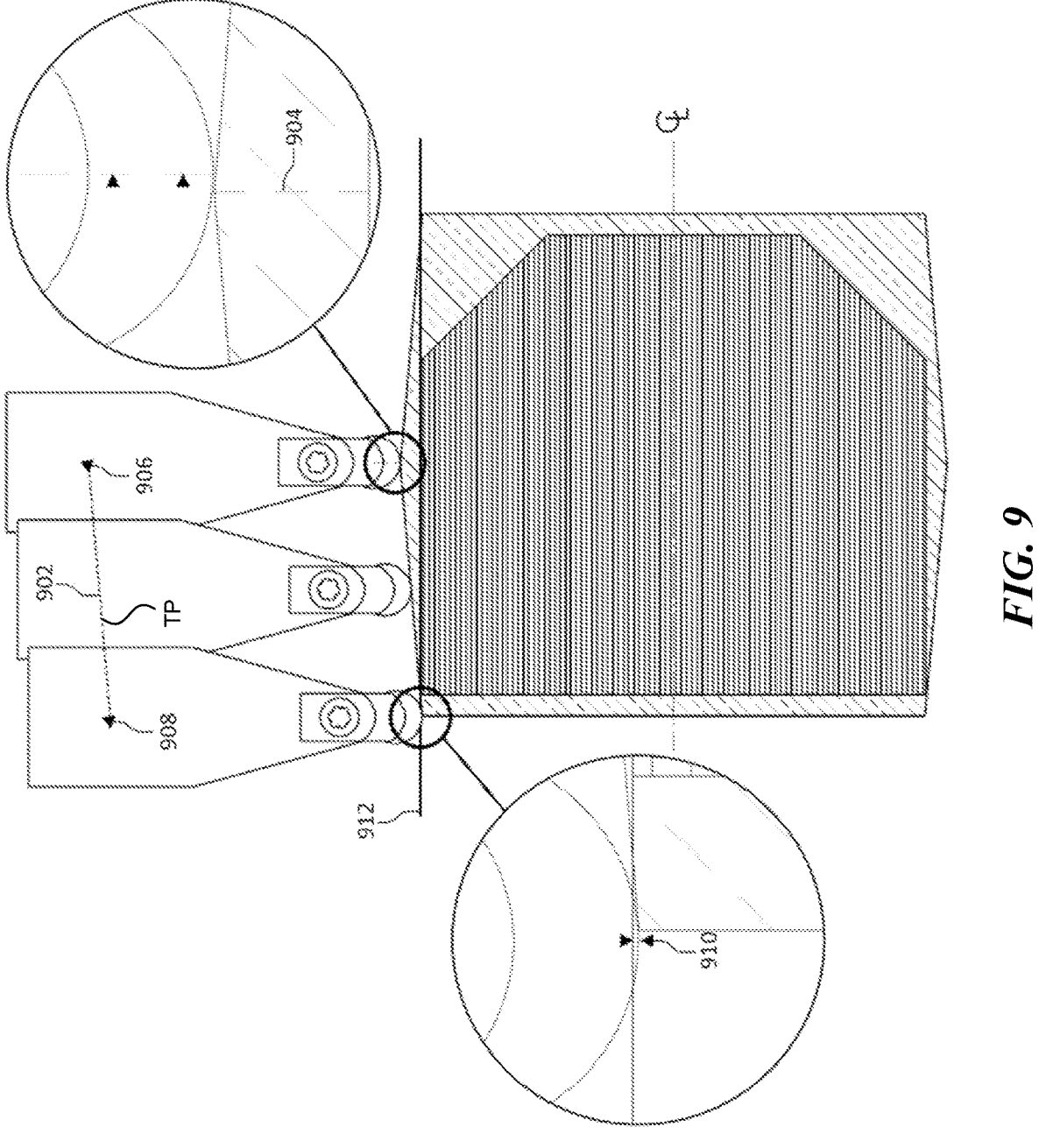
FIG. 9 is a cross section view diagram illustrating a second descending cut into a workpiece exhibiting a face configuration, in accordance with embodiments of the present technology.

FIG. 9 is a cross section view diagram showing a second cut 902 descending from above the workpiece towards the floor. The direction of the second cut is different than, (e.g., opposite to) the direction of the first cut, beginning on a different (e.g., opposite) side of the bisecting axis 904. The center of the tool proceeds from the start point 906 to the end point 908, where a portion 910 of the tool extends below the floor level 912 and is no longer in contact with the material. This second cut achieves the same two elements of the technology as the first cut (described above), but on a different (e.g., opposite) side of the workpiece.

Figure 10:
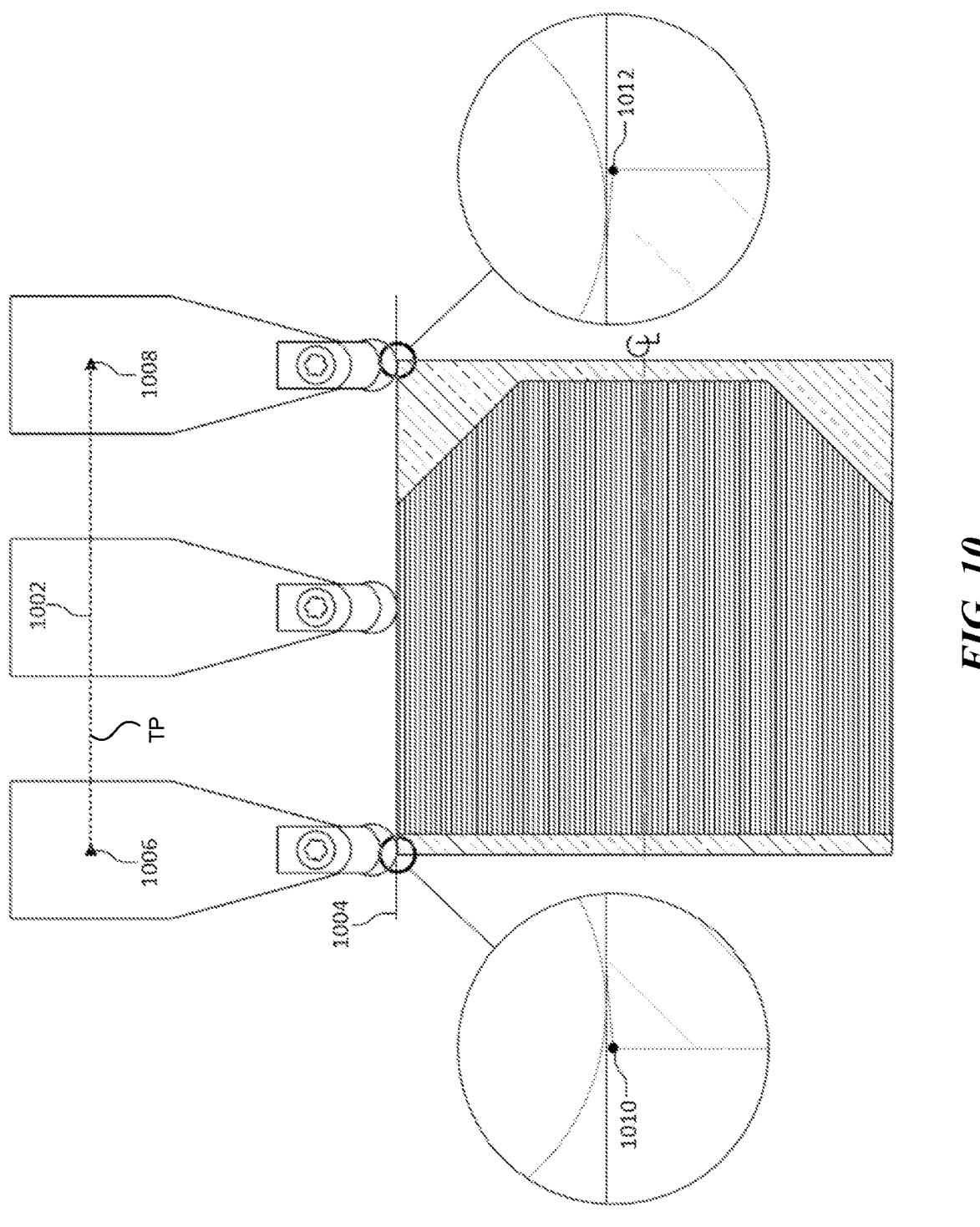
FIG. 10 is a cross section view diagram illustrating a third cut proceeding along a floor into a workpiece exhibiting a face configuration, in accordance with embodiments of the present technology.

FIG. 10 is a cross section view diagram showing a third cut 1002 moving along the floor line 1004. It can begin on the same side of the workpiece as the endpoint of the second cut, starting at the start point 1006 outside the workpiece and ending at the end point 1008. Furthermore, the angled nature of the workpiece that results from the prior, descending cuts avoids a corner strike at the beginning of the cut.

All three cuts not only, but length of each cut, e.g., for successive cuts that are inclined at a different angle that the preceding cut. By varying the effective cut depth, tool wear is distributed over a wide portion of the insert, greatly increasing insert life.

In at least some embodiments, the face portion of the workpiece is generally turned by performing sequences of three cuts like those described above. To further enhance tool life, and to more evenly utilize the cutting surfaces of the insert, the direction of cut can be alternated on each successive sequence of three cuts. For example, if the first sequence of three cuts starts with a left-to-right descending cut, then the next sequence of three cuts can start with a right-to-left descending cut.

Figure 11:
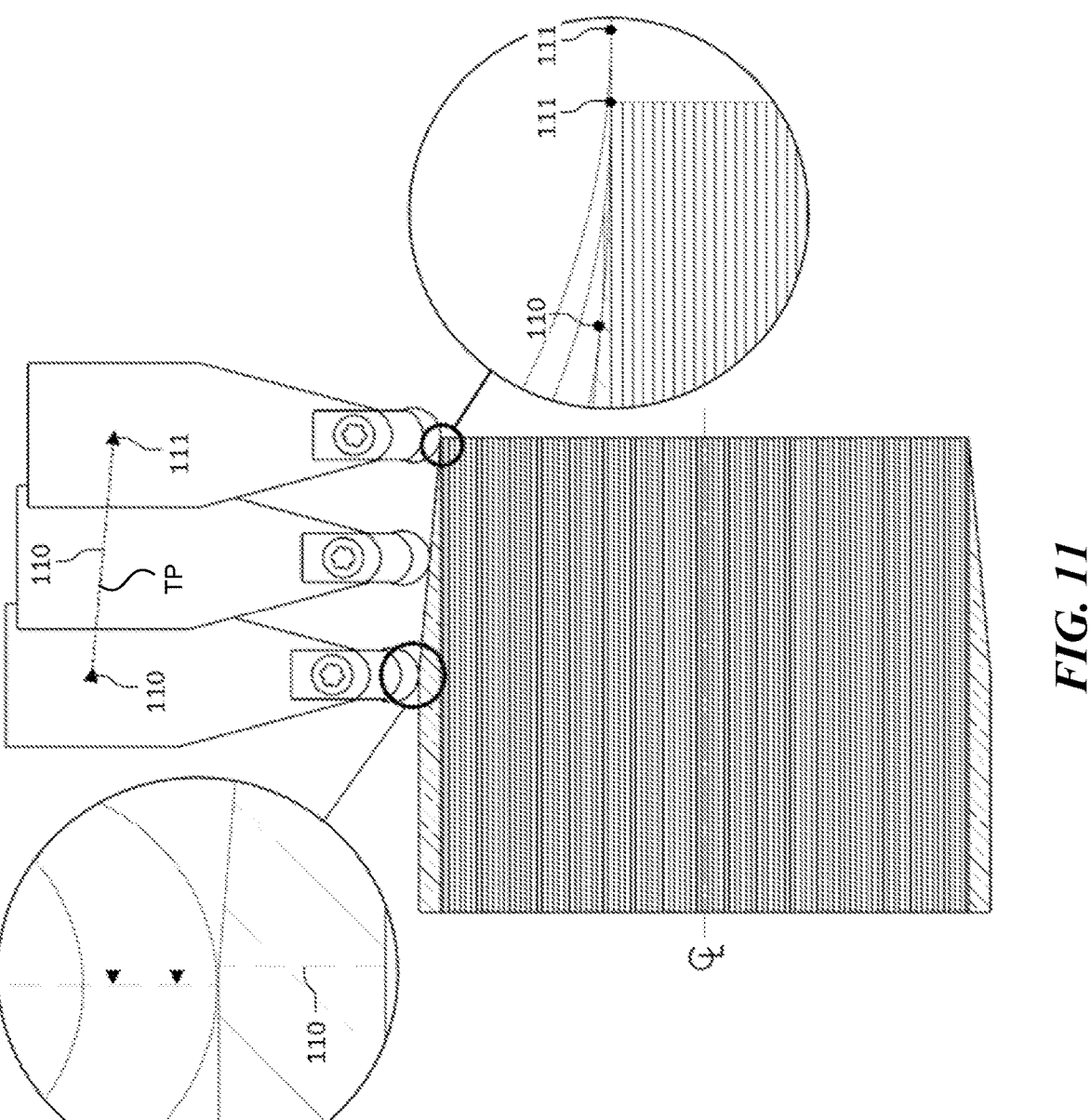
FIG. 11 is a cross section view diagram illustrating another shape of a first descending cut that avoids cutting into the part portion of a workpiece exhibiting a face configuration, in accordance with embodiments of the present technology.

The first and second descending cuts described above may need to be modified if placing their endpoints below the floor level would cause the cutter to collide with the part itself. FIG. 11 shows a representative modification of a left-to-right descending cut 1102 that avoids cutting into the part. The cut proceeds along a straight line, as before, beginning to the left of the vertical axis 1104 at the start point 1106, but at an intermediate point 1108, it transitions into an arc tangent to the floor ending at the end point 1110, and finally moves to a further point 1112 outside the workpiece. This type of cut largely preserves the above goals of the technology, while protecting the part from collision with the cutter.

In other embodiments, a portion of a workpiece in a pocket configuration is turned on a lathe with a cutting tool. This can be performed by (1) determining a location of a floor within the workpiece; (2) determining a point on the floor, a first point on a pocket wall, and a second point on a pocket wall; (3) performing a first descending cut from the first point on a pocket wall, passing through the point on the floor, such that the cut is generally tangent to the floor; and (4) performing a second descending cut from the second point on a pocket wall, passing through the point on the floor such that the cut is substantially tangent to the floor.

Figure 12:
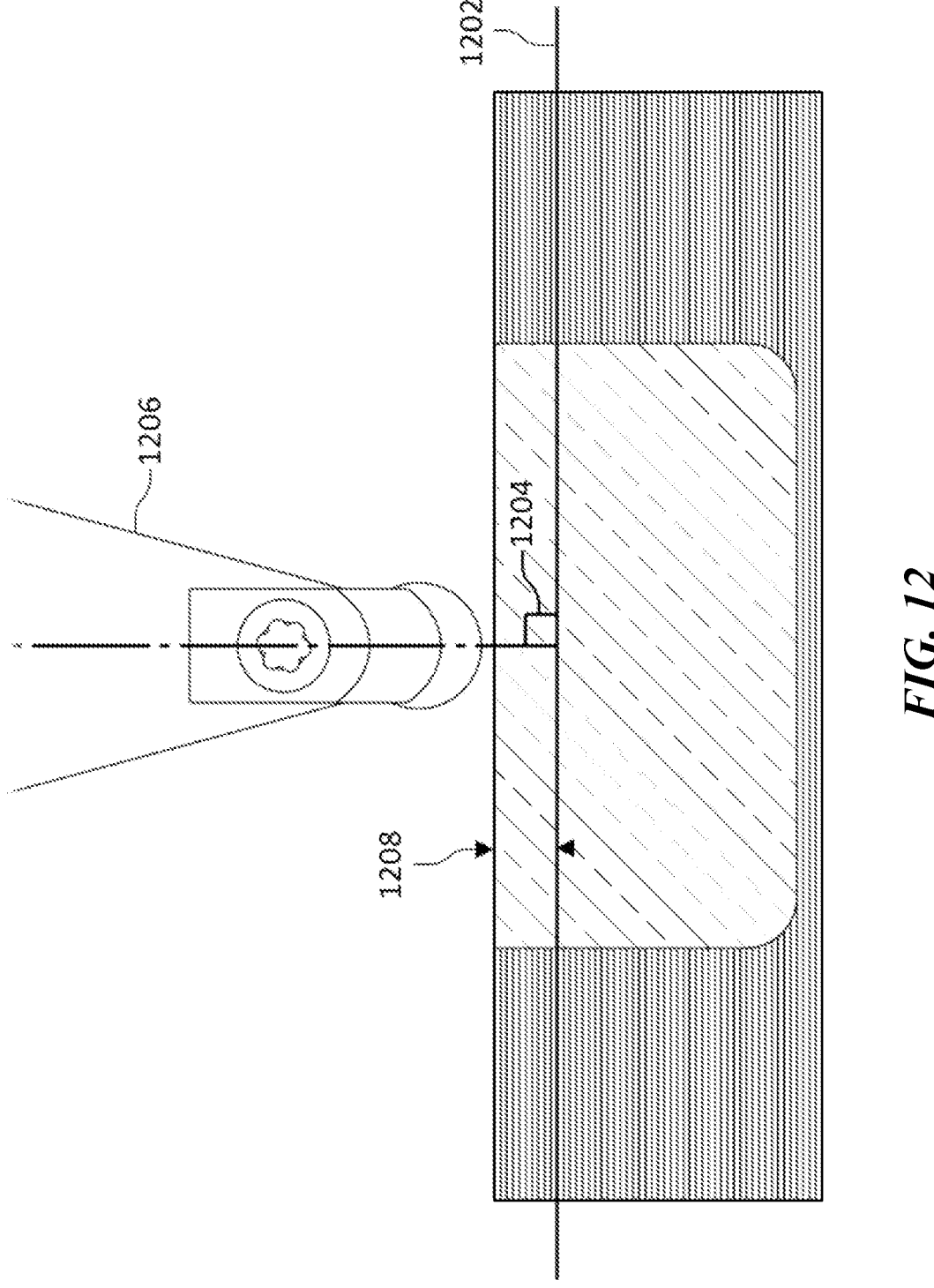
FIG. 12 is a cross section view diagram illustrating a process for determining a floor position inside a workpiece exhibiting a pocket configuration, in accordance with embodiments of the present technology.

FIG. 12 is a cross section view diagram illustrating a closer view of the workpiece shown in FIG. 4. The overall process includes determining a floor line 1202. In practice, the line direction is often set to be perpendicular or nearly perpendicular to the angular orientation 1204 of the cutting tool 1206, but this is not required.

Figure 13:
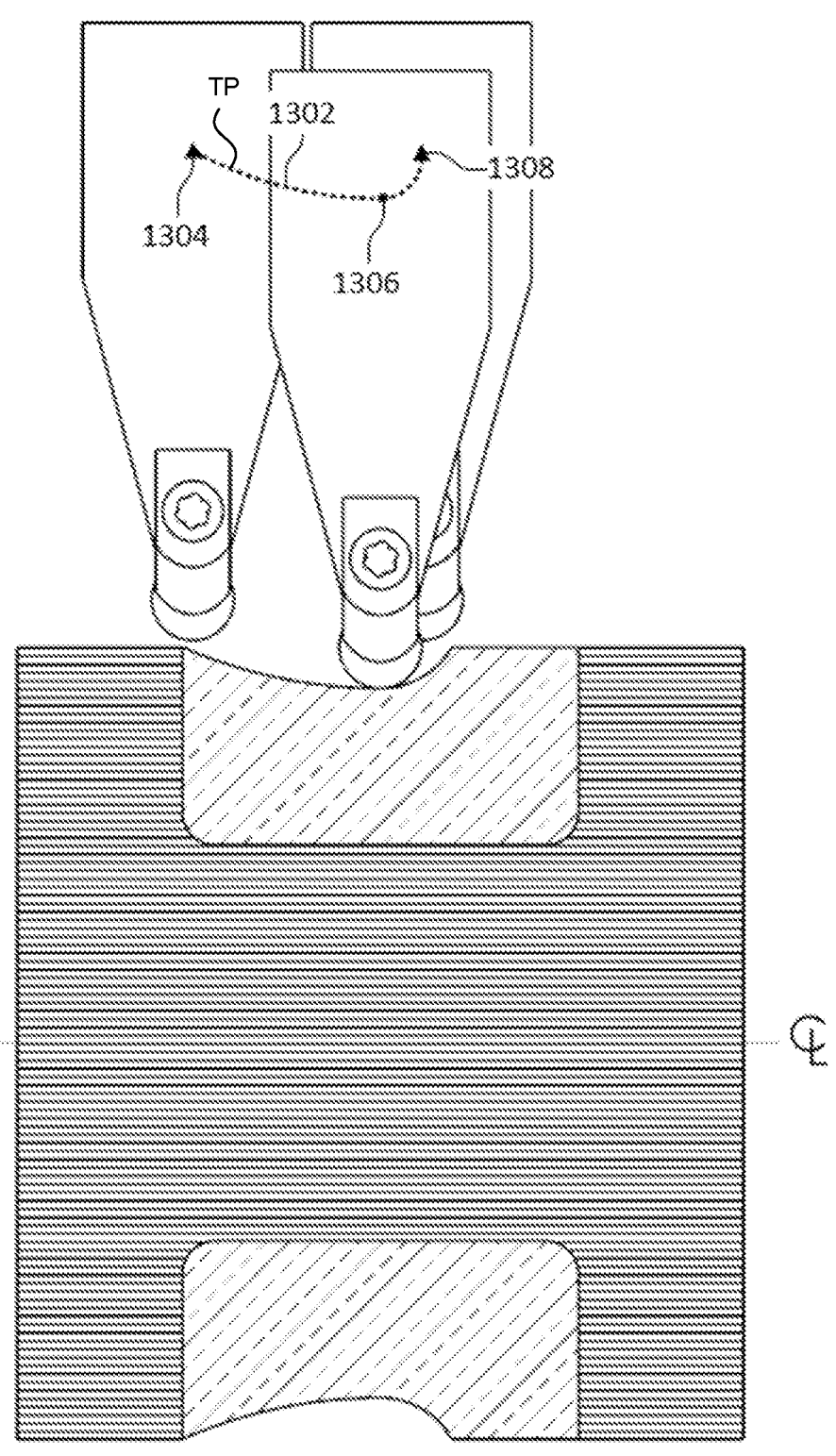
FIG. 13 is a cross section view diagram illustrating a first descending cut into a workpiece exhibiting a pocket configuration, in accordance with embodiments of the present technology.

FIG. 13 is a cross section view diagram showing a first cut 1302 descending from above the workpiece towards the floor. The direction of the cut is left-to-right in the diagram, but right-to-left is also possible. The following discussion of a left-to-right cut applies equally to a right-to-left cut except that everything is mirrored with respect to a vertical axis. The cut begins at the start point 1304, proceeds to point 1306, which is typically tangent to the floor, generally at the center of the pocket, and finishes at the end point 1308, which is sufficiently past the workpiece so that no portion of the cutter is still in contact with the workpiece at the end of the cut. In representative embodiments, the cutting motion is circular, as shown here, but this is not required.

Figure 14:
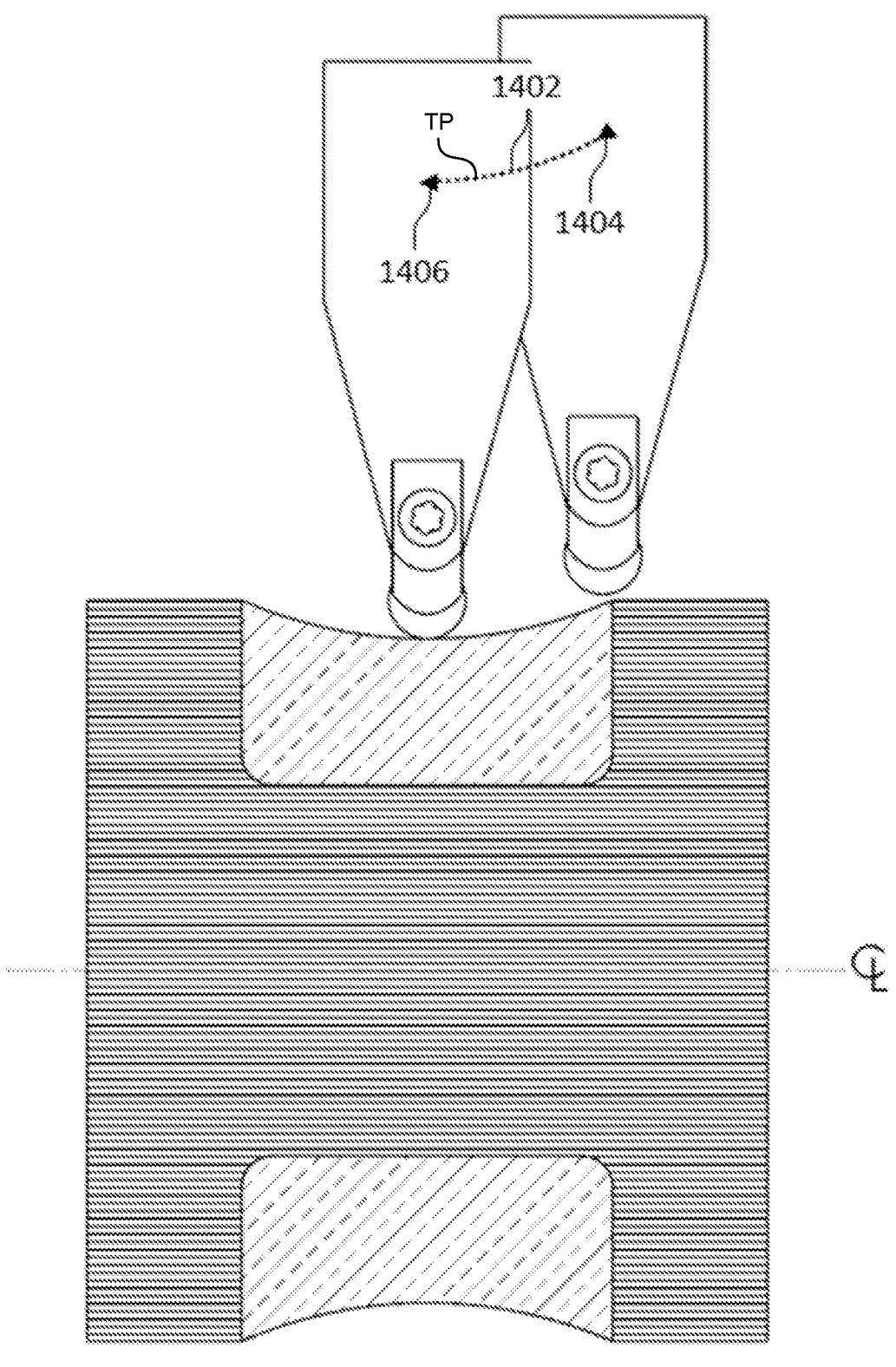
FIG. 14 is a cross section view diagram illustrating a second descending cut into a workpiece exhibiting a pocket configuration, in accordance with embodiments of the present technology.

FIG. 14 is a cross section view diagram showing a second cut 1402 descending from above the workpiece towards the floor. The direction of the second cut is different than (e.g., opposite to) the direction of the first cut 1302 (FIG. 13), beginning at the start point 1404 and finishing at the end point 1406, which is, in at least some embodiments, tangent to the floor, generally at the center of the pocket. Additional motion may be added so that no portion of the cutter is still in contact with the workpiece at the end of the cut, but this is not required.

In representative embodiments, the pocket portion of the workpiece is turned by performing sequences of two cuts like those described above. To further enhance tool life and more evenly utilize the cutting surface(s) of the insert, the direction of cut can be alternated on each successive sequence of two cuts. For example, if the first sequence of two cuts starts with a left-to-right descending cut, then the next sequence of two cuts can start with a right-to-left descending cut.

Although the referenced Figures show pocket walls that are linear, parallel to each other, and parallel to the orientation of the cutting tool, those skilled in the art will recognize that this is not required.

In other embodiments, a portion of a workpiece in a shoulder configuration is turned on a lathe with a cutting tool. This can be performed by (1) determining a location of a floor within the workpiece; (2) performing a first cut descending towards the floor; and (3) performing a second cut parallel to the floor.

Figure 15:
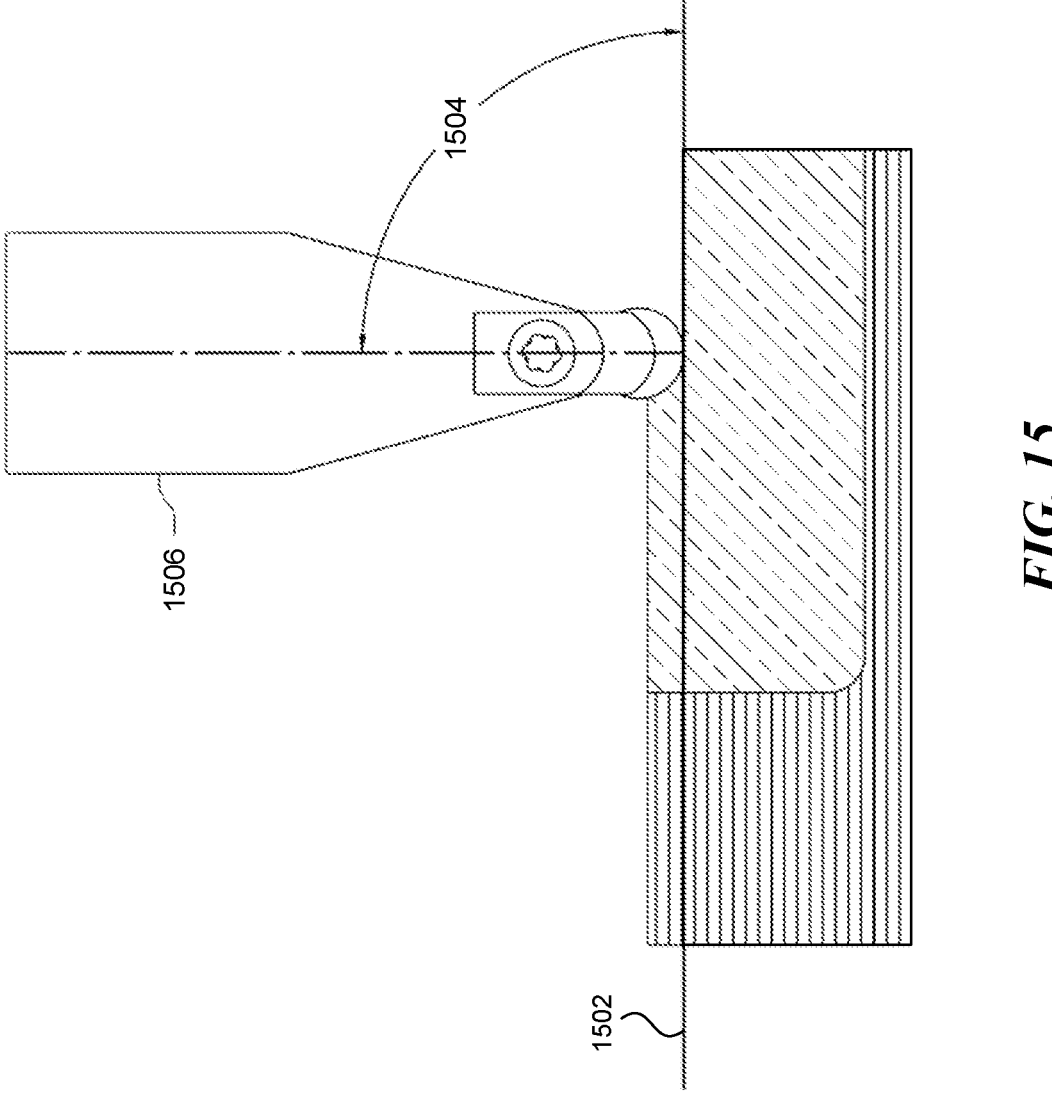
FIG. 15 is a cross section view diagram illustrating a process for determining a floor position inside a workpiece exhibiting a shoulder configuration, in accordance with embodiments of the present technology.

FIG. 15 is a cross section view diagram illustrating a closer view of the workpiece shown in FIG. 5. The representative manufacturing process includes determining a floor line 1502. In practice, the line direction is often set to be perpendicular or nearly perpendicular to the angular orientation 1504 of the cutting tool 1506, but this is not required.

Figure 16:
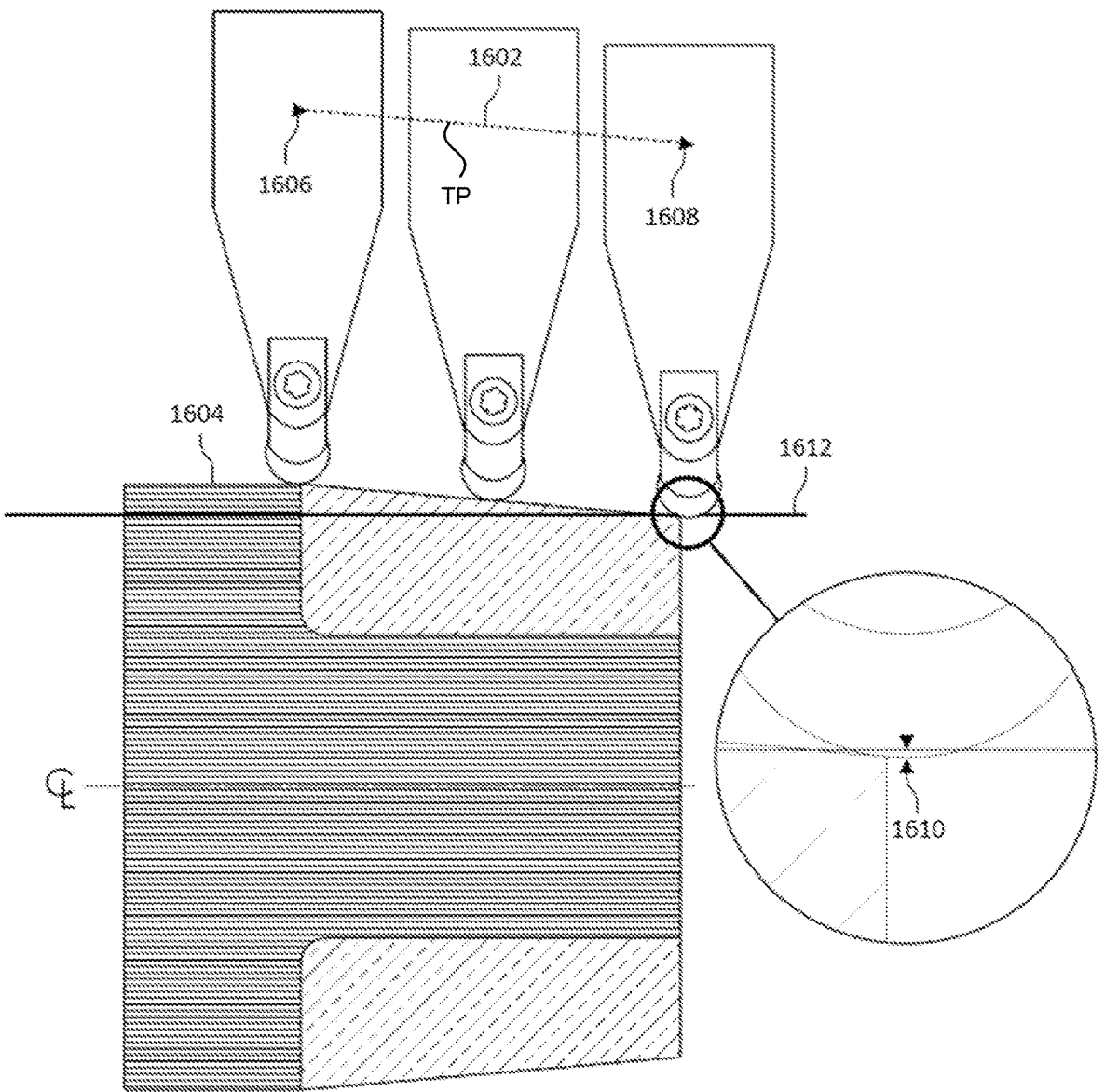
FIG. 16 is a cross section view diagram illustrating a first descending cut into a workpiece exhibiting a shoulder configuration, in accordance with embodiments of the present technology.

FIG. 16 is a cross section view diagram showing a first cut 1602 descending from above the workpiece towards the floor. The endpoints can be determined by starting the cut above the workpiece and near the top of the shoulder 1604. The center of the tool begins the cut at the start point 1606 and finishes at the end point 1608, where a portion 1610 of the tool extends below the floor level 1612 and is no longer in contact with the material, in at least some embodiments. The cutting motion shown here is linear, but those skilled in the art will recognize that this is not required.

As with the descending cuts for a workpiece in a face configuration, the descending cut described above may need to be modified if placing an endpoint below the floor level would cause the cutter to collide with (or enter) the part itself. In such a case, the descending cut can be modified in the same way, e.g., ending in an arc tangent to the floor that is extended beyond the workpiece.

Figure 17:
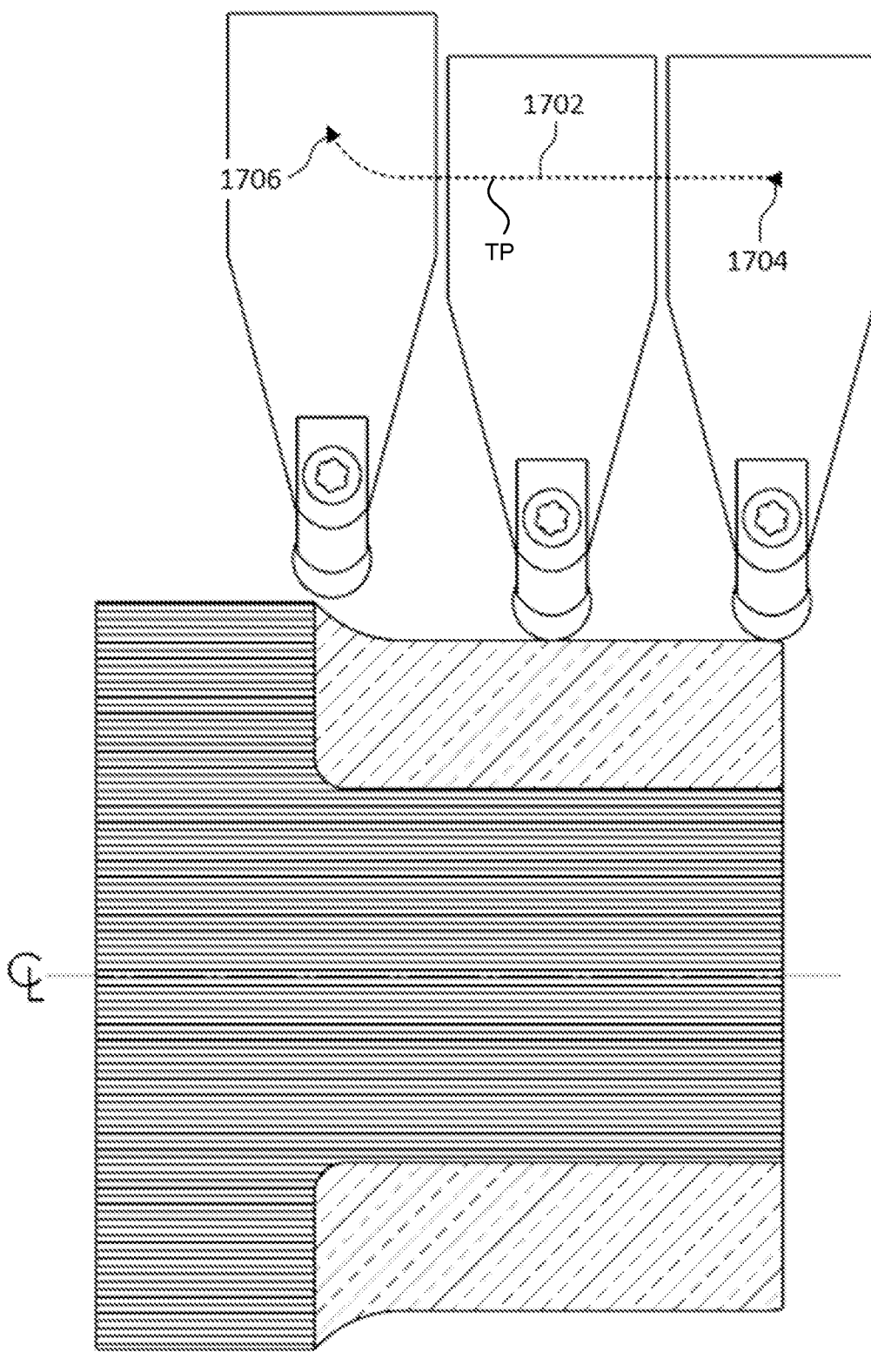
FIG. 17 is a cross section view diagram illustrating a second descending cut into a workpiece exhibiting a shoulder configuration, in accordance with embodiments of the present technology.

FIG. 17 is a cross section view diagram showing a second cut 1702 that is parallel to the floor. The direction of the second cut is different than (e.g., opposite to) the direction of the first cut, beginning at the start point 1704 and finishing at the end point 1706. In representative embodiments, the tool smoothly exits the material, and no portion of the cutter is still in contact with the workpiece at the end of the cut. The exit motion is shown as circular in FIG. 17, but those skilled in the art will recognize that this is not required.

In representative embodiments, the bulk of shoulder portion of the workpiece is turned by performing sequences of two cuts like those described above.

Although the referenced Figures show a shoulder wall that is linear and parallel to the orientation of the cutting tool, those skilled in the art will recognize that this is not required.

4. Further Embodiments

Each of the embodiments described above refer to a floor, illustrating this concept most simply with an infinite horizontal line in two-dimensional Figures. It should be noted that none of the embodiments require that the floor be infinite, horizontal, or even linear. For example, each embodiment can include a curved line as a floor, either finite or infinite and, as noted above, the orientation of the floor in real space is arbitrary.

Each of the embodiments described above is illustrated with a representative tool motion composed of linear and circular moves, in a particular order. These illustrations are for simplicity, and neither the type of motion nor the order of motion suggested by the illustrations is required. For example, the embodiment shown in FIGS. 8, 9, and 10 can employ an arcuate motion (e.g., not necessarily circular, and in addition to or in lieu of a straight-line motion), for the first and second descending cuts, and/or the third cut can be arc-shaped, particularly if the floor itself is non-linear.

Each of the embodiments described above is described with illustrations showing the cutter positioned generally perpendicular to the floor. This orientation is illustrated for simplicity but is not required. It will be appreciated by one skilled in the art that the cutter might well be tilted significantly with respect to the floor, for reasons such as holder collision avoidance or some other purpose.

Each embodiment described above can be implemented on a computing device to create tool paths for a numerically controlled lathe. According, embodiments of the technology described herein may take the form of computer- or machine- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Figure 18:
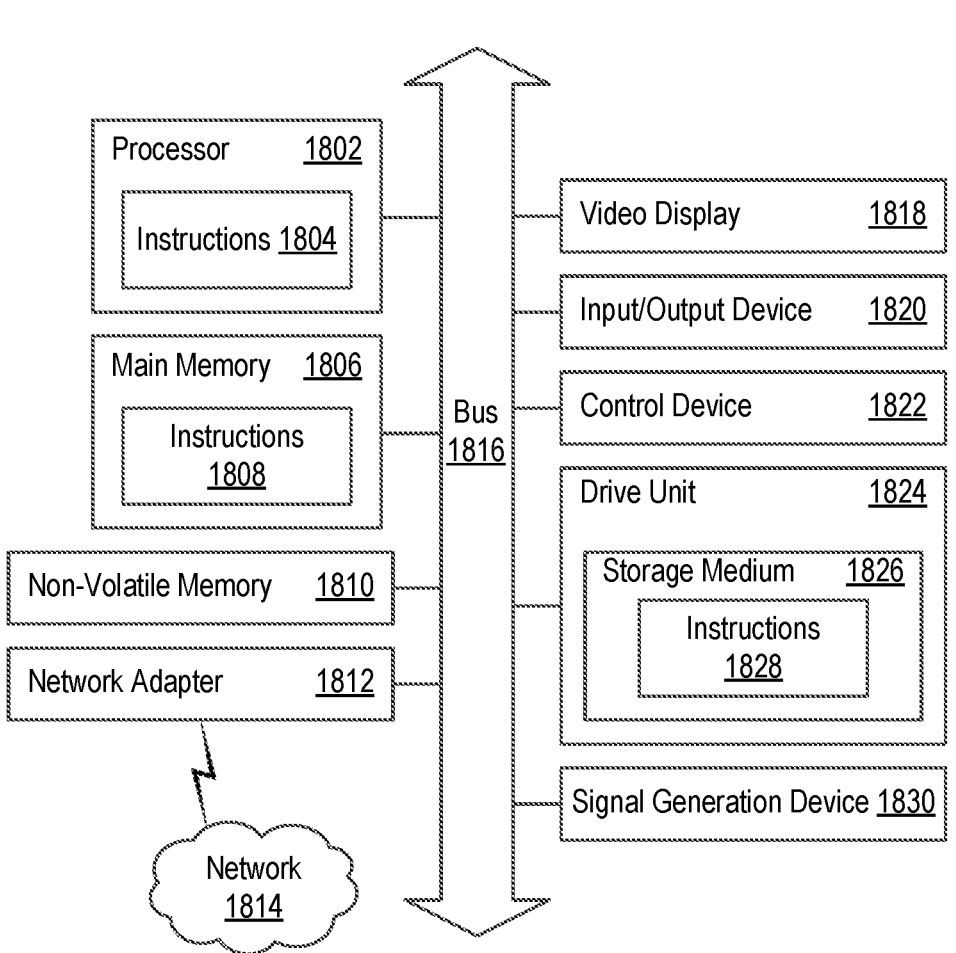
FIG. 18 is a schematic illustration of a controller configured to carry out methods in accordance with embodiments of the present technology.

FIG. 18 schematically illustrates a representative computer/controller system 1800 that can be programmed with instructions suitable for carrying out any of the foregoing techniques, and that can be coupled to a lathe or any other tool to perform the operations described herein.

The system 1800 can include a processor 1802, main memory 1806, non-volatile memory 1810, network adapter 1812, video display 1818, input/output device 1820, control device 1822 (e.g., a keyboard or pointing device), drive unit 1824 including a storage medium 1826, and signal generation device 1830 that are communicatively connected to a bus 1816. The bus 1816 is illustrated as an abstraction that represents one or more physical buses or point-to-point connections that are connected by appropriate bridges, adapters, or controllers. The bus 1816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 1806, non-volatile memory 1810, and storage medium 1826 are shown to be a single medium, the terms "machine-readable medium" and "storage medium" should be taken to include a single medium or multiple media (e.g., a centralized/distributed database and/or associated caches and servers) that store one or more sets of instructions 1828. The terms "machine-readable medium" and "storage medium" include any medium that is capable of storing, encoding, or carrying a set of instructions for execution by the system 1800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1804, 1808, 1828) set at various times in various memory and storage devices in a computing device. When read and executed by the processors 1802, the instruction(s) cause the system 1800 to perform operations to execute elements involving the various aspects of the present disclosure.

Further examples of machine- and computer-readable media include recordable-type media, such as volatile memory devices and non-volatile memory devices 1810, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1812 enables the system 1800 to mediate data in a network 1814 with an entity that is external to the system 1800 through any communication protocol supported by the system 1800 and the external entity. The network adapter 1812 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

The foregoing techniques can also be performed on a lathe manually or programmed directly into a numerically controlled lathe without using any other computing device.

From the foregoing, it will be appreciated that specific embodiments of the present technology have been described herein for purposes of illustration, but that various modifications may be made without deviating from the described technology. For example, method steps can be performed in various orders, and/or can include more, fewer and/or other steps. Systems can include more or fewer components than those described above, and/or the components can be implemented in software and/or hardware.

As used herein, the phrase "and/or" as in "A and/or B" refers to A alone, B alone, and both A and B. As used herein, the terms "about" and "approximately" refer to values within 10% of the stated value, unless otherwise specified. To the extent any materials incorporated herein by reference conflict with the present disclosure, the present disclosure controls.

The following examples provide further embodiments of the present technology.

EXAMPLES

1. A method for turning selected portions of a workpiece by a cutting tool, the method comprising:
determining a location of a floor within the workpiece;
performing a first cut descending towards the floor in a first direction;
performing a second cut descending towards the floor in a second direction; and performing a third cut parallel to the floor.
2. The method of example 1 wherein performing at least one of the first cut or the second cut includes causing the cutting tool to exit the workpiece below the floor.
3. The method of example 2 wherein performing at least one of the first cut or the second cut includes forming a burr positioned below the floor.
4. The method of any of examples 1-3 wherein performing at least one of the first cut or the second cut includes causing the cutting tool to exit the workpiece at an angle that is non-parallel to the floor.
5. The method any of examples 1-4 wherein performing at least one of the first cut or the second cut includes causing the cutting tool to exit the workpiece at least approximately tangent to the floor.
6. The method of any of examples 1-5 wherein at least one of the first cut or the second cut includes a straight segment.
7. The method of any of examples 1-6 wherein at least one of the first cut or the second cut includes an arcuate segment.
8. The method of any of examples 1-7 wherein the second direction is different than the first direction.
9. The method of example 8 wherein the second direction is opposite the first direction.
10. The method of any of examples 1-9 wherein the first, second, and third cuts form at least a portion of a face.
11. The method of any of examples 1-10 wherein the first, second, and third cuts form at least a portion of a pocket.
12. The method of any of examples 1-11 wherein a depth of at least one of the first cut or the second cut varies along a length of the at least one cut.

13. The method of any of examples 1-12, further comprising performing a fourth cut after the third cut and before any other cuts, the fourth cut being in at least approximately the second direction.
14. A method for turning selected portions of a workpiece by a cutting tool, the method comprising:
determining a location of a floor within the workpiece;
determining a point on the floor, a first point on a pocket wall, and a second point on a pocket wall;
performing a first descending cut from the first point on the pocket wall, passing through the point on the floor, such that the cut is at least approximately tangent to the floor; and
performing a second descending cut from the second point on a pocket wall, passing through the point on the floor such that the cut is at least approximately tangent to the floor.
15. The method of example 14 wherein at least one of the first cut or the second cut includes a straight segment.
16. The method of any of examples 14-15 wherein at least one of the first cut or the second cut includes an arcuate segment.
17. The method of any of examples 14-16 wherein the second descending cut is in a different direction than the first descending cut.
18. A method for turning selected portions of a workpiece by a cutting tool, the method comprising:
determining a location of a floor within the workpiece;
performing a first cut descending towards the floor; and
performing a second cut parallel to the floor.
19. The method of example 18 wherein performing at least one of the first cut or the second cut includes causing the cutting tool to exit the workpiece below the floor.
20. The method of example 19 wherein performing at least one of the first cut or the second cut includes forming a burr positioned below the floor.
21. The method of any of examples 18-20 wherein performing at least one of the first cut or the second cut includes causing the cutting tool to exit the workpiece at an angle that is non-parallel the floor.
22. The method of any of examples 18-21 wherein performing at least one of the first cut or the second cut includes causing the cutting tool to exit the workpiece at least approximately tangent to the floor.
23. The method of any of examples 18-22 wherein the first and second cuts form at least a portion of a shoulder.
24. The method any of examples 18-23 wherein at least one of the first cut or the second cut includes a straight segment.
25. The method any of examples 18-24 wherein at least one of the first cut or the second cut includes an arcuate segment.
26. A system for turning selected portions of a workpiece by a cutting tool, the system comprising:
a processor;
a computer-readable medium having instructions that, when executed by the processor:
receive a location of a floor within the workpiece;
direct a cutting tool to perform a first cut descending towards the floor in a first direction; and
direct the cutting tool to perform a second cut descending towards the floor in a second direction different than the first direction.
27. The system of example 26 wherein the instructions direct material removed from the workpiece to form a face, and wherein the instructions, when executed, direct the cutting tool to perform a third cut parallel to the floor.

28. The system of example 26 wherein the instructions, when executed, direct the cutting tool to form a shoulder.

29. The system of example 26 wherein the instructions, when executed, direct the cutting tool to form a pocket.

30. The system of any of examples 26-29 wherein the second direction is opposite the first direction.

We claim:

1. A method for turning selected portions of a workpiece by a cutting tool of a machine, the machine having a processor and a memory, the method comprising:

determining a location of a floor within the workpiece;

performing a first cut descending towards the floor in a first direction;

performing a second cut descending towards the floor in a second direction different from the first direction; and performing a third cut parallel to the floor;

wherein at least one of:

(a) performing the first cut comprises continuously varying a depth of the first cut relative to the floor from a start point of the first cut to an endpoint of the first cut; or (b) performing the second cut comprises continuously varying a depth of the second cut relative to the floor from a start point of the second cut to an endpoint of the second cut.

2. The method of claim 1 wherein performing at least one of the first cut or the second cut includes causing the cutting tool to exit the workpiece below the floor.

3. The method of claim 2 wherein performing at least one of the first cut or the second cut includes forming a burr positioned below the floor.

4. The method of claim 1 wherein performing at least one of the first cut or the second cut includes causing the cutting tool to exit the workpiece at an angle that is non-parallel to the floor.

5. The method of claim 1 wherein performing at least one of the first cut or the second cut includes causing the cutting tool to exit the workpiece at least approximately tangent to the floor.

6. The method of claim 1, wherein the second direction is opposite the first direction.

7. The method of claim 1 wherein the first, second, and third cuts form at least a portion of a face.

8. The method of claim 1 wherein the first, second, and third cuts form at least a portion of a pocket.

9. The method of claim 1, further comprising performing a fourth cut after the third cut and before any other cuts, the fourth cut being in at least approximately the second direction.

10. A method for turning selected portions of a workpiece by a cutting tool of a machine, the machine having a processor and a memory, the method comprising:

determining a location of a floor within the workpiece;

determining a point on the floor, a first point on a pocket wall, and a second point on a pocket wall;

performing a first descending cut from the first point on the pocket wall, passing through the point on the floor, such that the first descending cut is at least approximately tangent to the floor; and performing a second descending cut from the second point on a pocket wall, passing through the point on the floor such that the second descending cut is at least approximately tangent to the floor.

11. The method of claim 10 wherein at least one of the first descending cut or the second descending cut includes a straight segment.

12. The method of claim 10 wherein at least one of the first descending cut or the second descending cut includes an arcuate segment.

13. The method of claim 10 the second descending cut is in a different direction than the first descending cut.

14. A method for turning selected portions of a workpiece by a cutting tool of a machine, the machine having a processor and a memory, the method comprising:

determining a location of a floor within the workpiece;

performing a first cut descending towards the floor in a first direction; and performing a second cut parallel to the floor in a second direction different from the first direction;

wherein performing the first cut comprises continuously varying a depth of the first cut relative to the floor from a start point of the first cut to an endpoint of the first cut.

15. The method of claim 14 wherein performing at least one of the first cut or the second cut includes causing the cutting tool to exit the workpiece below the floor.

16. The method of claim 15 wherein performing at least one of the first cut or the second cut includes forming a burr positioned below the floor.

17. The method of claim 14 wherein performing at least one of the first cut or the second cut includes causing the cutting tool to exit the workpiece at an angle that is non-parallel the floor.

18. The method of claim 14 wherein performing at least one of the first cut or the second cut includes causing the cutting tool to exit the workpiece at least approximately tangent to the floor.

19. The method of claim 14 wherein the first and second cuts form at least a portion of a shoulder.

20. The method of claim 14 wherein the second cut includes a straight segment.

21. The method of claim 14 wherein the second cut includes an arcuate segment.

22. A system for turning selected portions of a workpiece by a cutting tool, the system comprising:

a processor; and a computer-readable medium having instructions that, when executed by the processor, cause the system to:

receive a location of a floor within the workpiece;

direct a cutting tool to perform a first cut descending towards the floor in a first direction; and direct the cutting tool to perform a second cut descending towards the floor in a second direction different than the first direction;

wherein at least one of:

(a) directing the cutting tool to perform the first cut comprises directing the cutting tool to exit the workpiece below the floor; or (b) directing the cutting tool to perform the second cut comprises directing the cutting tool to exit the workpiece below the floor.

23. The system of claim 22 wherein the instructions, when executed:

direct material removed from the workpiece to form a face; and direct the cutting tool to perform a third cut parallel to the floor.

24. The system of claim 22 wherein the instructions, when executed, direct the cutting tool to form a shoulder.

25. The system of claim 22 wherein the instructions, when executed, direct the cutting tool to form a pocket.

26. The system of claim 22 wherein the second direction is opposite the first direction.

27. The system of claim 22 wherein the instructions, when executed, direct the cutting tool to cut along an arc tangent to the floor.

28. The system of claim 22 wherein at least one of the first cut or the second cut includes an arcuate segment.

29. The system of claim 22 wherein the instructions, when executed:

direct the cutting tool to perform a third cut along a surface of the workpiece that is at least one of (a) non-parallel to the floor, or (b) non-parallel to a turning axis of the workpiece.

30. The system of claim 22 wherein at least one of:

(a) directing the cutting tool to perform the first cut comprises directing the cutting tool to exit the workpiece at an angle that is non-parallel to the floor; or (b) directing the cutting tool to perform the second cut comprises directing the cutting tool to exit the workpiece at an angle that is non-parallel to the floor.

31. The system of claim 22 wherein the system comprises the cutting tool, and wherein the cutting tool comprises a round insert for engaging the workpiece.

32. A system for turning selected portions of a workpiece by a cutting tool, the system comprising:

a processor; and a computer-readable medium having instructions that, when executed by the processor, cause the system to:

receive a target cutting depth within the workpiece;

direct a cutting tool to perform a first cut descending towards the target cutting depth in a first direction, wherein performing the first cut comprises continuously varying a depth of the first cut relative to the target cutting depth from a start point of the first cut to an endpoint of the first cut, and direct the cutting tool to perform a second cut descending towards the target cutting depth in a second direction different than the first direction.

* * * * *